US010877226B2

(12) United States Patent
Ma et al.

(10) Patent No.: US 10,877,226 B2
(45) Date of Patent: *Dec. 29, 2020

(54) REMOTE RELEASE TAB CONNECTOR ASSEMBLY

(71) Applicant: Senko Advanced Components, Inc., Marlborough, MA (US)

(72) Inventors: Siu Kei Ma, Tuen Mun (HK); Jeffrey Gniadek, Oxford, ME (US); Kazuyoshi Takano, Tokyo (JP); Kimman Wong, Kowloon (HK)

(73) Assignee: Senko Advanced Components, Inc., Marlborough, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/513,281

(22) Filed: Jul. 16, 2019

(65) Prior Publication Data

US 2019/0339464 A1    Nov. 7, 2019

Related U.S. Application Data

(63) Continuation of application No. 15/882,343, filed on Jan. 29, 2018, now Pat. No. 10,444,444.
(Continued)

(51) Int. Cl.
*G02B 6/38* (2006.01)
*G02B 6/40* (2006.01)

(52) U.S. Cl.
CPC ......... *G02B 6/3893* (2013.01); *G02B 6/3825* (2013.01); *G02B 6/3826* (2013.01);
(Continued)

(58) Field of Classification Search
CPC ..................... G02B 6/3826; G02B 6/3893
See application file for complete search history.

(56) References Cited

U.S. PATENT DOCUMENTS 3,721,945 A   3/1973   Hults
4,150,790 A   4/1979   Potter
(Continued)

FOREIGN PATENT DOCUMENTS

CA   2495693 A1   4/2004
CN   2836038 Y    11/2006
(Continued)

OTHER PUBLICATIONS

AFOP to Introduce LC Slimpac(TM) Uniboot Connectors as High Density Connector Solutions, Aug. 26, 2014, 1 page, https://www.marketscreener.com/ALLIANCE-FIBER-OPTIC-PROD-8289/news/Alliance-Fiber-Optic-Products-AFOP-to-introduce-LC-Slimpac-TM-Uniboot-Connectors-as-high-density-18956166.
(Continued)

*Primary Examiner* — Daniel Petkovsek
(74) *Attorney, Agent, or Firm* — Edward S. Jarmolowicz, Esq.

(57) ABSTRACT

An optical fiber connector assembly comprises at least one connector having a latching arm for coupling to an adapter, and a remote release tab having a protrusion configured to cooperate with the adapter to depress said latching arm when the remote release tab is pulled relative to the adapter. The optical fiber connector assembly may further be configured to have a deformable region at one end of the pull tab operatively connector to the latch arm assembly for releasing the connector from the adapter.

19 Claims, 16 Drawing Sheets

Related U.S. Application Data

(60) Provisional application No. 62/452,147, filed on Jan. 30, 2017.

(52) U.S. Cl.
CPC .......... *G02B 6/3885* (2013.01); *G02B 6/3898* (2013.01); *G02B 6/403* (2013.01)

(56) References Cited

U.S. PATENT DOCUMENTS

| | | | |
|---|---|---|---|
| 4,327,964 | A | 5/1982 | Haesly et al. |
| 4,478,473 | A | 10/1984 | Frear |
| 4,714,433 | A * | 12/1987 | Rider, Jr. .......... H01R 13/6272 439/310 |
| 4,762,388 | A | 8/1988 | Tanaka et al. |
| 4,764,129 | A | 8/1988 | Jones et al. |
| 4,840,451 | A | 6/1989 | Sampson et al. |
| 4,872,736 | A | 10/1989 | Myers et al. |
| 4,979,792 | A | 12/1990 | Weber et al. |
| 5,026,138 | A | 6/1991 | Boudreau et al. |
| 5,041,025 | A | 8/1991 | Haitmanek |
| D323,143 | S | 1/1992 | Ohkura et al. |
| 5,212,752 | A | 5/1993 | Stephenson et al. |
| 5,265,181 | A | 11/1993 | Chang |
| 5,289,554 | A | 2/1994 | Cubukeiyan et al. |
| 5,317,663 | A | 5/1994 | Beard et al. |
| 5,335,301 | A | 8/1994 | Newman et al. |
| 5,348,487 | A | 9/1994 | Marazzi et al. |
| 5,444,806 | A | 8/1995 | deMarchi et al. |
| 5,481,634 | A | 1/1996 | Anderson et al. |
| 5,506,922 | A | 4/1996 | Grois et al. |
| 5,521,997 | A | 5/1996 | Rovenolt et al. |
| 5,570,445 | A | 10/1996 | Chou et al. |
| 5,588,079 | A | 12/1996 | Tanabe et al. |
| 5,684,903 | A | 11/1997 | Kyomasu et al. |
| 5,687,268 | A | 11/1997 | Stephenson et al. |
| 5,781,681 | A | 7/1998 | Manning |
| 5,845,036 | A | 12/1998 | De Marchi |
| 5,915,987 | A | 6/1999 | Reed et al. |
| 5,937,130 | A | 8/1999 | Amberg et al. |
| 5,956,444 | A | 9/1999 | Duda et al. |
| 5,971,626 | A | 10/1999 | Knodell et al. |
| 6,041,155 | A | 3/2000 | Anderson et al. |
| 6,049,040 | A | 4/2000 | Biles et al. |
| 6,134,370 | A | 10/2000 | Childers et al. |
| 6,178,283 | B1 | 1/2001 | Weigel |
| RE37,080 | E | 3/2001 | Stephenson et al. |
| 6,206,577 | B1 | 3/2001 | Hall, III et al. |
| 6,206,581 | B1 | 3/2001 | Driscoll et al. |
| 6,227,717 | B1 | 5/2001 | Ott et al. |
| 6,238,104 | B1 | 5/2001 | Yamakawa et al. |
| 6,247,849 | B1 | 6/2001 | Liu |
| 6,276,840 | B1 | 8/2001 | Weiss et al. |
| 6,364,537 | B1 | 4/2002 | Maynard |
| 6,379,052 | B1 | 4/2002 | de Jong et al. |
| 6,447,170 | B1 | 9/2002 | Takahashi et al. |
| 6,461,054 | B1 | 10/2002 | Iwase |
| 6,471,412 | B1 | 10/2002 | Belenkiy et al. |
| 6,478,472 | B1 | 11/2002 | Anderson et al. |
| 6,485,194 | B1 | 11/2002 | Shirakawa |
| 6,530,696 | B1 | 3/2003 | Ueda et al. |
| 6,551,117 | B2 | 4/2003 | Poplawski et al. |
| 6,565,262 | B2 | 5/2003 | Childers et al. |
| 6,579,014 | B2 | 6/2003 | Melton et al. |
| 6,623,172 | B1 | 9/2003 | de Jong et al. |
| 6,634,796 | B2 | 10/2003 | de Jong et al. |
| 6,634,801 | B1 | 10/2003 | Waldron et al. |
| 6,648,520 | B2 | 11/2003 | McDonald et al. |
| 6,668,113 | B2 | 12/2003 | Togami et al. |
| 6,682,228 | B2 | 1/2004 | Rathnam et al. |
| 6,685,362 | B2 | 2/2004 | Burkholder et al. |
| 6,695,486 | B1 | 2/2004 | Falkenberg |
| 6,854,894 | B1 | 2/2005 | Yunker et al. |
| 6,869,227 | B2 | 3/2005 | Del Grosso et al. |
| 6,872,039 | B2 | 3/2005 | Baus et al. |
| 6,935,789 | B2 | 8/2005 | Gross, III et al. |
| 7,036,993 | B2 | 5/2006 | Luther et al. |
| 7,052,186 | B1 | 5/2006 | Bates |
| 7,077,576 | B2 | 7/2006 | Luther et al. |
| 7,090,406 | B2 | 8/2006 | Melton et al. |
| 7,090,407 | B2 | 8/2006 | Melton et al. |
| 7,091,421 | B2 | 8/2006 | Kukita et al. |
| 7,111,990 | B2 | 9/2006 | Melton et al. |
| 7,113,679 | B2 | 9/2006 | Melton et al. |
| D533,504 | S | 12/2006 | Lee |
| D534,124 | S | 12/2006 | Taguchi |
| 7,150,567 | B1 | 12/2006 | Luther et al. |
| 7,153,041 | B2 | 12/2006 | Mine et al. |
| 7,198,409 | B2 | 4/2007 | Smith et al. |
| 7,207,724 | B2 | 4/2007 | Gurreri |
| D543,124 | S | 5/2007 | Raatikainen |
| D543,146 | S | 5/2007 | Chen et al. |
| 7,258,493 | B2 | 8/2007 | Milette |
| 7,264,402 | B2 | 9/2007 | Theuerkorn et al. |
| 7,281,859 | B2 | 10/2007 | Mudd et al. |
| D558,675 | S | 1/2008 | Chien et al. |
| 7,315,682 | B1 | 1/2008 | En Lin et al. |
| 7,325,976 | B2 | 2/2008 | Gurreri et al. |
| 7,325,980 | B2 | 2/2008 | Pepe |
| 7,329,137 | B2 | 2/2008 | Martin et al. |
| 7,331,718 | B2 | 2/2008 | Yazaki et al. |
| 7,354,291 | B2 | 4/2008 | Caveney et al. |
| 7,371,082 | B2 | 5/2008 | Zimmel et al. |
| 7,387,447 | B2 | 6/2008 | Mudd et al. |
| 7,390,203 | B2 | 6/2008 | Murano et al. |
| D572,661 | S | 7/2008 | En Lin et al. |
| 7,431,604 | B2 | 10/2008 | Waters et al. |
| 7,463,803 | B2 | 12/2008 | Cody et al. |
| 7,465,180 | B2 | 12/2008 | Kusuda et al. |
| 7,473,124 | B1 | 1/2009 | Briant et al. |
| 7,507,103 | B1 * | 3/2009 | Phillips ................. G02B 6/4201 439/352 |
| 7,510,335 | B1 | 3/2009 | Su et al. |
| 7,513,695 | B1 | 4/2009 | Lin et al. |
| 7,540,666 | B2 | 6/2009 | Luther et al. |
| 7,561,775 | B2 | 7/2009 | Lin et al. |
| 7,588,373 | B1 | 9/2009 | Sato et al. |
| 7,591,595 | B2 | 9/2009 | Lu et al. |
| 7,594,766 | B1 | 9/2009 | Sasser et al. |
| 7,641,398 | B2 | 1/2010 | O'Riorden et al. |
| 7,651,361 | B2 * | 1/2010 | Henry ................. H01R 13/6272 439/352 |
| 7,695,199 | B2 | 4/2010 | Teo et al. |
| 7,699,533 | B2 | 4/2010 | Milette |
| 7,785,019 | B2 | 8/2010 | Lewallen et al. |
| 7,824,113 | B2 | 11/2010 | Wong et al. |
| 7,837,395 | B2 | 11/2010 | Lin et al. |
| D641,708 | S | 7/2011 | Yamauchi |
| 8,083,450 | B1 | 12/2011 | Smith et al. |
| 8,152,385 | B2 | 4/2012 | de Jong et al. |
| 8,186,890 | B2 | 5/2012 | Lu |
| 8,192,091 | B2 | 6/2012 | Hsu et al. |
| 8,202,009 | B2 | 6/2012 | Lin et al. |
| 8,251,733 | B2 | 8/2012 | Wu |
| 8,267,595 | B2 | 9/2012 | Lin et al. |
| 8,270,796 | B2 | 9/2012 | Nhep |
| 8,408,815 | B2 | 4/2013 | Lin et al. |
| 8,465,317 | B2 | 6/2013 | Gniadek et al. |
| 8,534,928 | B2 | 9/2013 | Cooke et al. |
| 8,556,645 | B2 * | 10/2013 | Crain ................... H01R 13/633 438/258 |
| 8,559,781 | B2 | 10/2013 | Childers et al. |
| 8,622,634 | B2 | 1/2014 | Arnold et al. |
| 8,636,424 | B2 | 1/2014 | Kuffel et al. |
| 8,641,293 | B2 | 2/2014 | Lin |
| 8,651,749 | B2 | 2/2014 | Dainese, Jr. et al. |
| 8,676,022 | B2 | 3/2014 | Jones |
| 8,678,670 | B2 | 3/2014 | Takahashi et al. |
| 8,727,638 | B2 | 5/2014 | Lee et al. |
| 8,770,863 | B2 | 7/2014 | Cooke et al. |
| 8,998,505 | B2 * | 4/2015 | Motofuji .............. G02B 6/3879 385/78 |
| 9,028,270 | B1 | 5/2015 | Vanderwoud |

(56) References Cited

U.S. PATENT DOCUMENTS

| | | |
|---|---|---|
| 9,310,569 B2 | 4/2016 | Lee |
| 9,366,829 B2 | 6/2016 | Czosnowski et al. |
| 9,411,110 B2 | 8/2016 | Barnette et al. |
| 9,465,172 B2 | 10/2016 | Shih |
| 9,494,744 B2 | 11/2016 | de Jong |
| 9,548,557 B2 | 1/2017 | Liu |
| 9,551,842 B2 | 1/2017 | Theuerkorn |
| 9,557,495 B2 | 1/2017 | Raven et al. |
| 9,568,686 B2 | 2/2017 | Fewkes et al. |
| 9,581,768 B1 | 2/2017 | Baca et al. |
| 9,599,778 B2 | 3/2017 | Wong et al. |
| 9,658,409 B2 | 5/2017 | Gniadek et al. |
| 9,684,313 B2 | 6/2017 | Cline et al. |
| 9,709,753 B1 | 7/2017 | Chang et al. |
| 9,778,425 B2 | 10/2017 | Nguyen et al. |
| 9,798,094 B2 | 10/2017 | Kuffel et al. |
| 9,829,645 B2 | 11/2017 | Good et al. |
| 9,869,825 B2 | 1/2018 | Bailey et al. |
| 9,880,361 B2 | 1/2018 | Childers et al. |
| 9,946,035 B2 | 4/2018 | Gustafson et al. |
| 10,031,296 B2 | 7/2018 | Good |
| 10,185,099 B2 * | 1/2019 | Chang ................. G02B 6/3825 |
| 10,444,444 B2 * | 10/2019 | Ma ....................... G02B 6/3885 |
| 2001/0026661 A1 | 10/2001 | de Jong et al. |
| 2002/0172467 A1 | 11/2002 | Anderson et al. |
| 2002/0191919 A1 | 12/2002 | Nolan |
| 2003/0053787 A1 | 3/2003 | Lee |
| 2003/0063862 A1 * | 4/2003 | Fillion ................. G02B 6/3825 385/53 |
| 2003/0157825 A1 | 8/2003 | Kane |
| 2004/0052473 A1 | 3/2004 | Seo et al. |
| 2004/0136657 A1 | 7/2004 | Ngo |
| 2004/0141693 A1 | 7/2004 | Szilagyi et al. |
| 2004/0161958 A1 | 8/2004 | Togami et al. |
| 2004/0184741 A1 | 9/2004 | Del Grosso et al. |
| 2004/0234209 A1 | 11/2004 | Cox et al. |
| 2004/0247252 A1 | 12/2004 | Ehrenreich et al. |
| 2005/0111796 A1 | 5/2005 | Matasek et al. |
| 2005/0141817 A1 | 6/2005 | Yazaki et al. |
| 2005/0207709 A1 | 9/2005 | Del Grosso et al. |
| 2006/0013539 A1 | 1/2006 | Thaler et al. |
| 2006/0089049 A1 | 4/2006 | Sedor |
| 2006/0127025 A1 | 6/2006 | Haberman |
| 2006/0140543 A1 | 6/2006 | Abendschein et al. |
| 2006/0160429 A1 | 7/2006 | Dawiedczyk et al. |
| 2006/0269194 A1 | 11/2006 | Luther et al. |
| 2006/0274411 A1 | 12/2006 | Yamauchi |
| 2007/0025665 A1 | 2/2007 | Dean, Jr. et al. |
| 2007/0028409 A1 | 2/2007 | Yamada |
| 2007/0079854 A1 | 4/2007 | You |
| 2007/0098329 A1 | 5/2007 | Shimoji et al. |
| 2007/0149062 A1 | 6/2007 | Long et al. |
| 2007/0230874 A1 | 10/2007 | Lin |
| 2007/0232115 A1 | 10/2007 | Burke et al. |
| 2007/0243749 A1 | 10/2007 | Wu |
| 2008/0008430 A1 | 1/2008 | Kewitsch |
| 2008/0044137 A1 | 2/2008 | Luther et al. |
| 2008/0069501 A1 | 3/2008 | Mudd et al. |
| 2008/0101757 A1 | 5/2008 | Lin et al. |
| 2008/0226237 A1 | 9/2008 | O'Riorden |
| 2008/0267566 A1 | 10/2008 | Lin et al. |
| 2009/0022457 A1 | 1/2009 | de Jong et al. |
| 2009/0028507 A1 | 1/2009 | Jones et al. |
| 2009/0092360 A1 | 4/2009 | Lin et al. |
| 2009/0196555 A1 | 8/2009 | Lin et al. |
| 2009/0214162 A1 | 8/2009 | O'Riorden |
| 2009/0220197 A1 | 9/2009 | Gniadek |
| 2009/0220200 A1 | 9/2009 | Sheau Tung Wong et al. |
| 2009/0290938 A1 | 11/2009 | Lin |
| 2010/0034502 A1 | 2/2010 | Lu et al. |
| 2010/0092136 A1 | 4/2010 | Nhep |
| 2010/0220961 A1 | 9/2010 | de Jong et al. |
| 2010/0239220 A1 | 9/2010 | Lin et al. |
| 2010/0247041 A1 | 9/2010 | Szilagyi |
| 2010/0284656 A1 | 11/2010 | Morra et al. |
| 2010/0322561 A1 | 12/2010 | Lin et al. |
| 2011/0044588 A1 | 2/2011 | Larson et al. |
| 2011/0045683 A1 | 2/2011 | Foung |
| 2011/0058773 A1 | 3/2011 | Peterhans et al. |
| 2011/0131801 A1 | 6/2011 | Nelson et al. |
| 2011/0155810 A1 | 6/2011 | Taniguchi et al. |
| 2011/0177710 A1 | 7/2011 | Tobey |
| 2011/0239220 A1 | 9/2011 | Gibson et al. |
| 2012/0099822 A1 | 4/2012 | Kuffel et al. |
| 2012/0155810 A1 | 6/2012 | Nakagawa |
| 2012/0189260 A1 | 7/2012 | Kowalczyk et al. |
| 2012/0237177 A1 | 9/2012 | Minota |
| 2012/0269485 A1 | 10/2012 | Haley et al. |
| 2012/0301080 A1 | 11/2012 | Gniadek |
| 2013/0071067 A1 | 3/2013 | Lin |
| 2013/0089995 A1 | 4/2013 | Gniadek et al. |
| 2013/0094816 A1 | 4/2013 | Lin et al. |
| 2013/0121653 A1 | 5/2013 | Shitama et al. |
| 2013/0170797 A1 | 7/2013 | Ott |
| 2013/0183012 A1 | 7/2013 | Cabanne Lopez et al. |
| 2013/0216185 A1 | 8/2013 | Klavuhn et al. |
| 2013/0216188 A1 * | 8/2013 | Lin ....................... G02B 6/3893 385/77 |
| 2013/0259429 A1 | 10/2013 | Czosnowski et al. |
| 2013/0272671 A1 | 10/2013 | Jones |
| 2013/0308915 A1 | 11/2013 | Buff et al. |
| 2013/0308916 A1 | 11/2013 | Buff et al. |
| 2013/0322825 A1 | 12/2013 | Cooke et al. |
| 2013/0323949 A1 * | 12/2013 | De Dios Martin ........................ H01R 13/6335 439/160 |
| 2014/0016901 A1 | 1/2014 | Lambourn et al. |
| 2014/0023322 A1 | 1/2014 | Gniadek et al. |
| 2014/0050446 A1 | 2/2014 | Chang |
| 2014/0056562 A1 | 2/2014 | Limbert et al. |
| 2014/0133808 A1 | 5/2014 | Hill et al. |
| 2014/0219621 A1 | 8/2014 | Barnette et al. |
| 2014/0226946 A1 | 8/2014 | Cooke et al. |
| 2014/0241644 A1 | 8/2014 | Kang et al. |
| 2014/0241678 A1 | 8/2014 | Brinquier et al. |
| 2014/0241688 A1 | 8/2014 | Isenhour et al. |
| 2014/0334780 A1 | 11/2014 | Nguyen et al. |
| 2014/0348477 A1 | 11/2014 | Chang |
| 2015/0003788 A1 | 1/2015 | Chen et al. |
| 2015/0030289 A1 | 1/2015 | Jiang et al. |
| 2015/0111417 A1 | 4/2015 | Vanderwoud |
| 2015/0212282 A1 | 6/2015 | Lin |
| 2015/0277059 A1 | 10/2015 | Raven et al. |
| 2015/0301294 A1 | 10/2015 | Chang |
| 2015/0355417 A1 | 10/2015 | Takano |
| 2015/0331201 A1 | 11/2015 | Takano et al. |
| 2015/0378113 A1 | 12/2015 | Good et al. |
| 2016/0116685 A1 | 4/2016 | Wong et al. |
| 2016/0172852 A1 | 6/2016 | Takano |
| 2016/0291262 A1 | 6/2016 | Chang |
| 2016/0195682 A1 | 7/2016 | Takano |
| 2016/0216458 A1 | 7/2016 | Shih |
| 2016/0259135 A1 | 9/2016 | Gniadek et al. |
| 2016/0266326 A1 | 9/2016 | Gniadek |
| 2016/0320572 A1 | 11/2016 | Gniadek |
| 2016/0131849 A1 | 12/2016 | Takano |
| 2016/0349458 A1 | 12/2016 | Murray et al. |
| 2017/0003458 A1 | 1/2017 | Gniadek |
| 2017/0023746 A1 | 1/2017 | Good |
| 2017/0176691 A1 | 6/2017 | Childers et al. |
| 2017/0254966 A1 | 9/2017 | Gniadek et al. |
| 2017/0293088 A1 | 10/2017 | Manes et al. |
| 2017/0293089 A1 | 10/2017 | Gustafson et al. |
| 2017/0293090 A1 | 10/2017 | Hopper et al. |
| 2018/0128987 A1 | 5/2018 | Good et al. |
| 2018/0156988 A1 | 6/2018 | Gniadek et al. |
| 2018/0156999 A1 | 6/2018 | Buff et al. |
| 2018/0164511 A1 | 6/2018 | Childers et al. |
| 2018/0172923 A1 | 6/2018 | Bauco et al. |
| 2018/0172924 A1 | 6/2018 | Bauco et al. |
| 2018/0172942 A1 | 6/2018 | Bauco et al. |
| 2018/0217339 A1 | 8/2018 | Ma et al. |
| 2018/0217340 A1 | 8/2018 | Wong et al. |

(56) References Cited

U.S. PATENT DOCUMENTS

FOREIGN PATENT DOCUMENTS

| | | | |
|---|---|---|---|
| CN | 201383588 Y | 1/2010 | |
| CN | 2026500189 U | 12/2013 | |
| DE | 202006011910 U1 | 3/2007 | |
| DE | 102006019335 A1 | 10/2007 | |
| EP | 1074868 A1 | 7/2001 | |
| EP | 1211537 A2 | 6/2002 | |
| EP | 1245980 A2 | 10/2002 | |
| EP | 1566674 A1 | 8/2005 | |
| GB | 2111240 A | 6/1983 | |
| JP | 2009229545 A | 10/2009 | |
| JP | 2009276493 A | 11/2009 | |
| TW | 200821653 A | 5/2008 | |
| WO | WO2001/79904 A2 | 10/2001 | |
| WO | WO2004/027485 A1 | 4/2004 | |
| WO | WO2008/112986 A1 | 9/2008 | |
| WO | WO2009/135787 A1 | 11/2009 | |
| WO | WO2010/024851 A2 | 3/2010 | |
| WO | WO2012/136702 A1 | 10/2012 | |
| WO | WO2012/162385 A1 | 11/2012 | |
| WO | 2013052070 A1 | 4/2013 | |
| WO | WO2014/028527 A1 | 2/2014 | |
| WO | WO2014/182351 A1 | 11/2014 | |
| WO | WO2015/191024 A1 | 12/2015 | |
| WO | WO2016/148741 A1 | 9/2016 | |

OTHER PUBLICATIONS

Shimoji et al., Development of MINI-MPO Connectory, Furukawa Reveiw, 1999, available on line at least Jul. 16, 2011.
International Search Report and Opinion for PCT/US2018/016049 dated Apr. 13, 2018, 8 pages.
International Search Report and Written Opinion for Application No. PCT/US17/64643, dated May 9, 2018, 10 pages.
Non-Final Office Action, U.S. Appl. No. 15/882,343, dated Nov. 11, 2018, pp. 12.
International Search Report and Written Opinion for Application No. PCT/US2011/058799, dated Nov. 1, 2011.
Fiber Optic Connectors and Assemblies Catalog, 2009, Huber & Suhner Fiber Optics, Herisau, Switzerland, http://www.google.co.in/uri?sa=t&source=web&cd=63&ved=0CCMQFjACODw&url=http%3A%2F%Fwww.hubersuhner.com%2Fwrite_rtn_binary.pdf%3Fbnaryid%3D8DBC7DE2EB72D315%26binarytype%3D48403DAA363AEB7E&ci=ZvcvTujWH4ntsAfH-dXZCg&usg=AFQiCNEIMdC-4avewRJU61DVetlWYbr0QQ.
Fiber Optic Interconnect Solutions, Tactical Fiber Optic Connector Cables and Termini, 2006, Glenair, Inc., Glendale, California.
Fiber Optic Products Catalog, Nov. 2007, Tyco Electronics Corporation, Harrisburg, Pennsylvania.
International Search Report and Written Opinion for Application No. PCT/US2012/039126, dated Aug. 27, 2012.
European Search Report and Written Opinion dated Mar. 3, 2015 for EP14187661.
European Search Report and Written Opinion dated Feb. 19, 2015 for EP14168005.
"Fiber Optic Connectors and Assemblies Catalog," 2009, Huber & Suhner Fiber Optics, Herisau, Switzerland, www.google.co.in/uri?sa=t&source=web&cd=63&ved=0CCMQFjACODw&url=http%3A%2F%Fwww.hubersuhner.com%2Fwrite_rtn_binary.pdf%3Fbnaryid%3D8DBC7DE2EB72D315%26binarytype%3D48403DAA363AEB7E&ci=ZvcvTujWH4ntrAfH-dXZCg&usg=AFQiCNEIMdC-4avewRJU61DVc_WYbr0QQ.
"Fiber Optic Interconnect Solutions, Tactical Fiber Optic Connectors, Cables and Termini," 2006, Glenair, Inc., Glendale, California, www.mps-electronics.de/fileadmin/files/MPS-E/Produkte/Katalog/Glenair/Katalog-Glenair-LWL-1110.pdf.
"Fiber Optic Products Catalog," Nov. 2007, Tyco Electronics Corporation, Harrisburg, Pennsylvania, www.ampnetconnect.com/documents/Fiber%20OPtics%20Catalog%201107.pdf.
International Search Report and Written Opinion dated Apr. 27, 2012 for PCT/US2011/058799.
International Search Report and Written Opinion dated Aug. 27, 2012 for PCT/US2012/039126.
International Search Report and Written Opinion dated Jan. 16, 2014 for PCT/US2013/054784.
International Search Report and Written Opinion dated Aug. 29, 2014 for PCT/US2014/041500.
International Search Report and Written Opinion dated May 14, 2014 for PCT/US2014/012137.
International Search Report and Written Opinion dated Aug. 21, 2008 for PCT/US2008/057023.
International Preliminary Report on Patentability dated Sep. 14, 2017 from related International Application No. PCT/US2015/059458, International filing date Nov. 6, 2015.
International Search Report for WO2008112986 dated Sep. 15, 2009.
ISR WO2012162385, Nov. 29, 2012.
ISR WO2014028527, Jul. 16, 2015.
ISR WO2015191024, Oct. 9, 2014.
ISR WO2015US57610, Sep. 22, 2016.
ISR WO2016176083, May 19, 2016.
ISR WO2016148741, Sep. 22, 2016.
U.S. Re-Examination Application Serial No. 90/014,456 of U.S. Pat. No. 10,191,230 filed Feb. 19, 2020, 191 pages.

* cited by examiner

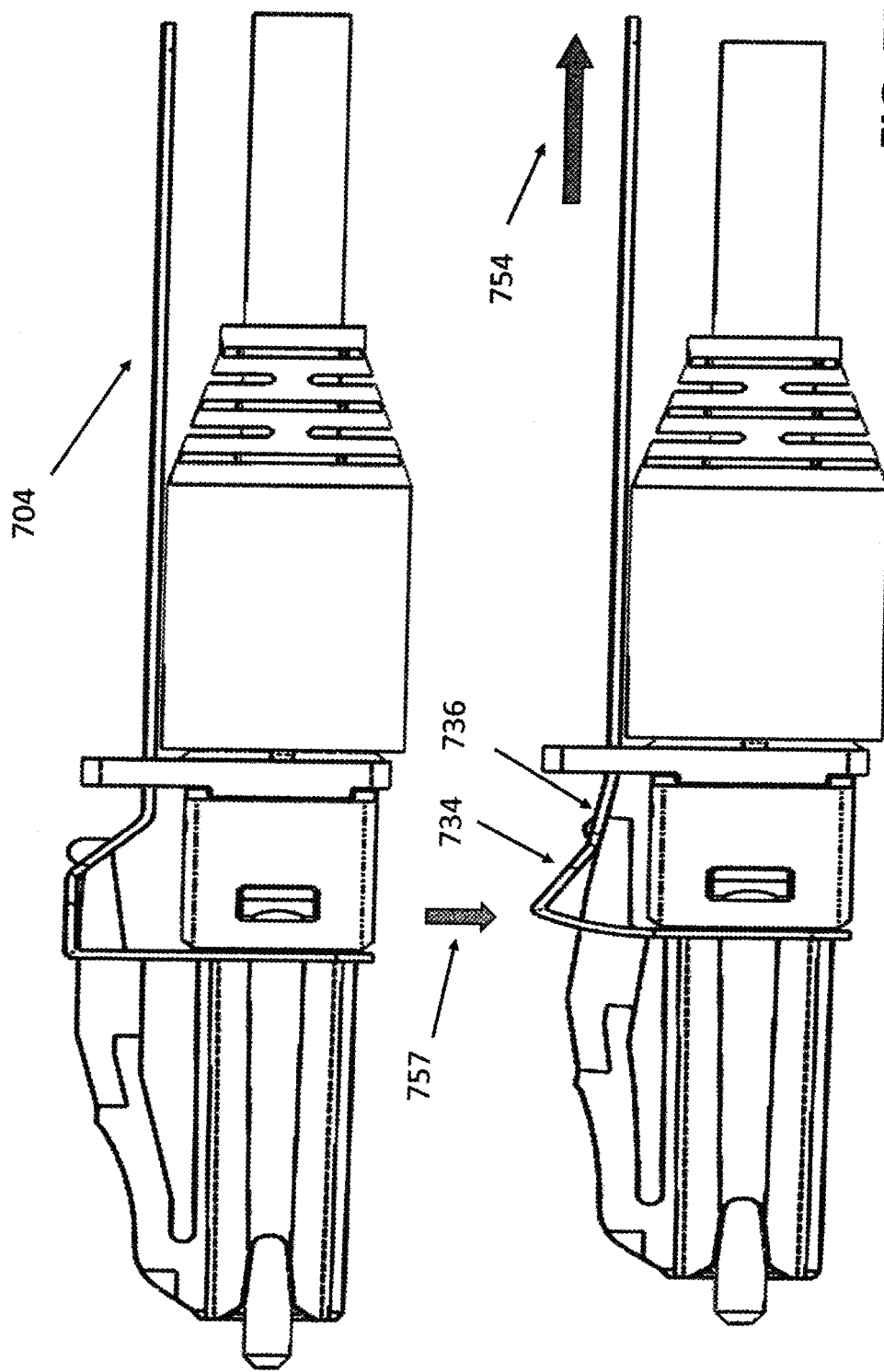

REMOTE RELEASE TAB CONNECTOR ASSEMBLY

CROSS-REFERENCE TO RELATED-APPLICATIONS

This application is a continuation of U.S. patent application Ser. No. 15/882,343 filed on Mar. 29, 2018, entitled "Remote Release Tab Connector Assembly," now U.S. Pat. No. 10,444,444, and this application claims the benefit of priority of U.S. Provisional Application No. 62/452,147 filed Jan. 30, 2017, entitled "Narrow Width Adapters and Connectors with Modular Latching Arm", each of which is incorporated herein by reference in its entirety.

BACKGROUND

The present disclosure relates generally to optical fiber connectors, and more specifically to optical fiber connectors having remote release tabs.

The prevalence of the Internet has led to unprecedented growth in communication networks. Consumer demand for service and increased competition has caused network providers to continuously find ways to improve quality of service while reducing cost.

Certain solutions have included deployment of high-density interconnect panels. High-density interconnect panels may be designed to consolidate the increasing volume of interconnections necessary to support the fast-growing networks into a compacted form factor, thereby increasing quality of service and decreasing costs such as floor space and support overhead.

Multiple fibers may be arranged within a single connector. Connectors generally include a housing portion that contains a ferrule that terminates the ends of the fibers. Ferrules are generally used to retain the ends of the optical fibers for connecting the optical fibers. There are several types of standardized fiber optic connectors which include various ferrule diameters, as well as multiple fiber mechanical transfer or MT ferrules. Typically, connectors are joined together to connect the optical transmission path of one fiber optic cable to another fiber optic cable or device, and the connection may be made by inserting the connectors in an adapter. An adapter generally includes a housing, or portion of a housing, having at least one port which is configured to receive and hold a connector to facilitate the optical connection of the connector ferrule with the ferrule of another connector or other device. Adapters may be used to facilitate connections contained within a chassis. The term "chassis" as used herein broadly refers to a containment structure for housing electrical components or switching components.

In communication networks, such as data centers and switching networks, numerous interconnections between mating connectors may be compacted into high-density panels. Panel and connector producers may optimize for such high densities by shrinking the connector size and/or the spacing between adjacent connectors on the panel. However, in a high-density panel configuration, adjacent connectors and cable assemblies may obstruct access to the individual connectors. Such physical obstructions may impede the ability of an operator to insert and remove cables and the connectors.

Furthermore, as a result of the use of pre-terminated fiber assemblies, the issue of maintaining polarity in parallel fiber-optic links is becoming increasingly important. Polarity maintains proper continuity between transmitters and receivers. In order to make sure that connectors are mated correctly with an adapter, the connector and adapter typically include fixed keying features that permit the connector to be mated with the adapter in generally only one mating configuration. While this has the advantage of preventing a connection that has the wrong polarity, it also can make it difficult to change the polarity of the connection on site.

Therefore, there remains a need for fiber optic connectors that can be remotely released and have the flexibility of easily changing the polarity of the connector on site.

SUMMARY

According to one aspect of the present disclosure, there is provided an optical fiber connector assembly comprising at least one connector, a latch arm for coupling to an adapter, and a remote release tab having a protrusion configured to cooperate with the adapter to depress said latch arm when the remote release tab is pulled relative to the adapter.

In some embodiments, the remote release tab may be coupled to the latch arm. The remote release tab may further comprise a window configured to receive the latch arm. In some embodiments, the remote release tab may be configured such that the protrusion slides along the latch arm when the remote release tab is pulled relative to the adapter. In some embodiments, the remote release tab may further be configured such that the protrusion interacts with an inner portion of the adapter to receive a downward force needed to depress said latch arm. In some embodiments, the inner portion of the adapter may be a fixed portion. In some embodiments, the protrusion may have a wedge shape. In various embodiments, the remote release tab may be configured such that the protrusion pushes down the latch arm substantially simultaneously as sliding along an inner portion of the adapter.

In some embodiments, the optical fiber connector assembly may further comprise a boot, and the remote release tab may be configured to extend over the boot.

In some embodiments, the optical fiber connector assembly may comprise a guide configured to receive the remote release tab. In various embodiments, the guide may be further configured to rotate to allow reversing a polarity of the optical fiber connector assembly.

Some embodiments of the optical fiber connector assembly may comprise a housing configured to receive the at least one connector. Some embodiments of the connector assembly may further comprise a latch arm assembly including the latch arm. The latch arm assembly may have a first portion configured to couple to the at least one connector and a second portion configured to engage the housing. In some embodiments of the connector assembly, the latch arm may foe coupled to the at least one connector. In other embodiments, the at least one connector may include the latch arm as an integral structure.

BRIEF DESCRIPTION OF THE DRAWINGS

FIG. 7B is a side perspective view of FIG. 7A in a first or forward position and in a second or rearward position according to aspects of the present disclosure;

DETAILED DESCRIPTION

Figure 1:
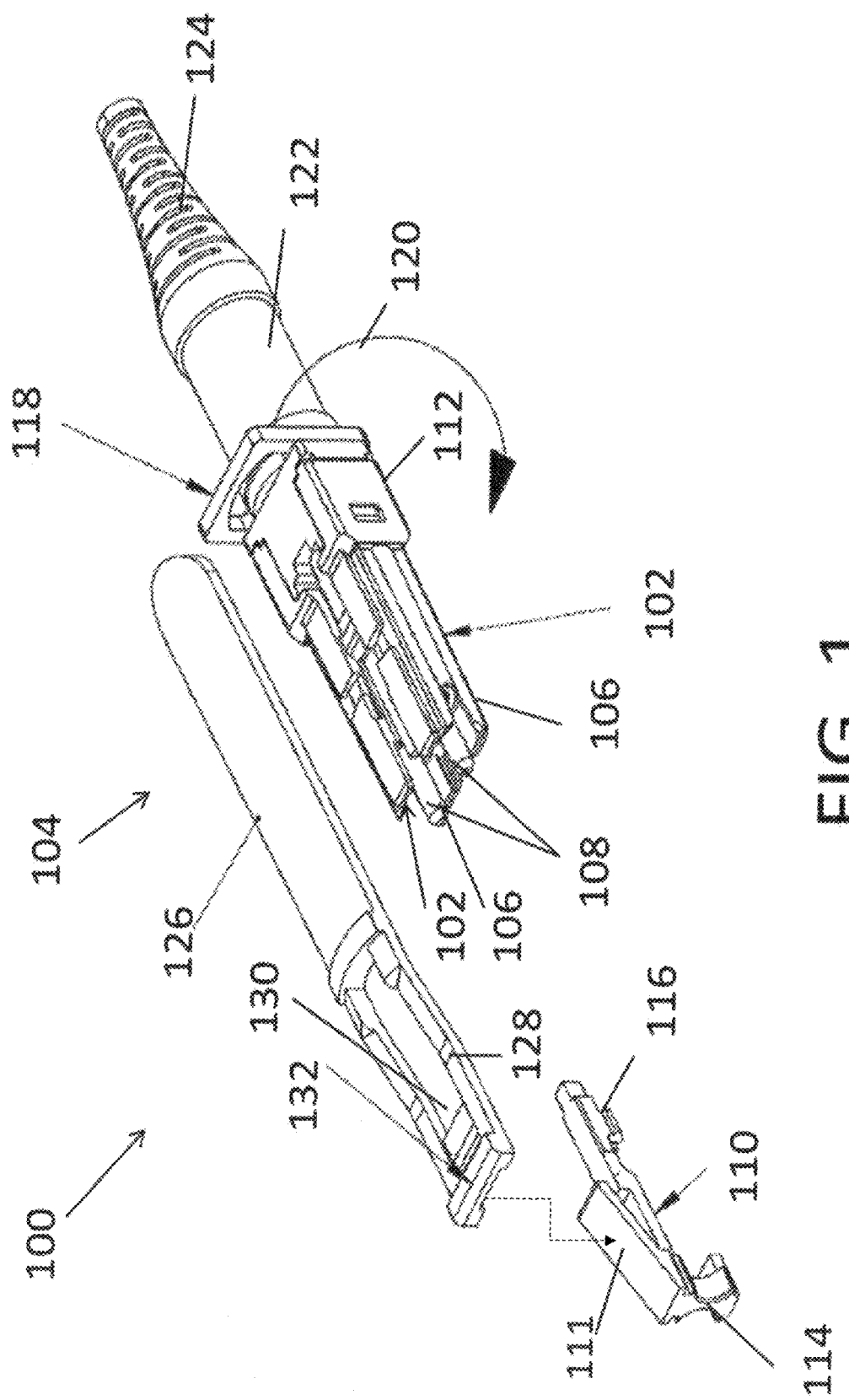
FIG. 1 is a perspective view of a partially disassembled optical fiber connector assembly having a remote release tab according to aspects of the present disclosure.

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but: not limited to."

The following terms shall have, for the purposes of this application, the respective meanings set forth below.

A connector, as used herein, refers to a device and/or components thereof that connects a first module or cable to a second module or cable. The connector may be configured for fiber optic transmission or electrical signal transmission. The connector may be any suitable type now known or later developed, for example, embodiments of multiple-fiber push-on/pull-off (MPO) connectors, such as the Senko mini MPO connector and the Senko MPO Plus connector. The connector may generally be defined by a connector housing body.

A "fiber optic cable" or an "optical cable" refers to a cable containing one or more optical fibers for conducting optical signals in beams of light. The optical fibers can be constructed from any suitable transparent material, including glass, fiberglass, and plastic. The cable can include a jacket or sheathing material surrounding the optical fibers. In addition, the cable can be connected to a connector on one end or on both ends of the cable.

Various embodiments provide single fiber and multi-fiber connectors having a remote release tab, also referred to as a pull tab or a push pull tab. Some embodiments may be configured to allow polarity changes.

The pull tab of a typical connector may interact solely with the profile of the connector latch arm to flex the latch arm downward the distance needed to allow the connector to become unlatched from within the adapter/coupler for removal. Alternatively, the pull tab of a connector may work to solely lift an adapter hook a required distance to allow the connector to become unlatched for removal.

Various embodiments of connectors disclosed herein include an outer main body with a unique un-latching system. Various embodiments described herein generally provide optical fiber connectors with remote release tabs configured to allow a user to easily remove or insert connectors into adapters or couplers, such as adapters disposed on a high density panel without damaging surrounding connectors, accidentally disconnecting surrounding connectors, disrupting transmissions through surrounding connectors, and/or the like.

Various embodiments of connectors disclosed herein include a remote release tab having a tip configured to interact with an inner portion of the top surface of an adapter or coupler to provide some of the downward force needed to unlatch the connector from the adapter or coupler. In some embodiments, the inner portion of the top surface of the adapter or coupler may be a fixed portion that does not move.

In some embodiments, the tip of the remote release tab may be a wedge shaped tip. The connector may have a latch arm and may be configured such that as the remote release tab is pulled back, the tip of the remote release tab slides upwards along the slope of the latch arm of the connector. At a certain distance of retraction of the remote release tab, the wedge shape comes in contact with an inner portion of the top surface of the adapter. Upon additional retraction of the remote release tab, the wedge shaped tip simultaneously begins to push down the connector latch arm while sliding along the inner portion of the top surface of the adapter. As the connector latch arm is depressed to a sufficient distance, it becomes unlatched from the adapter, and any additional pulling of the remote release tab results in removing the connector from the adapter.

In some embodiments, the tip of the remote release tab may be a latch. The connector may have a latch arm connected to the latch, the remote release arm may further comprise a window or guide further configured to receive the latch arm. The remote release latch is coupled to the latch arm via a protrusion at a first end of the latch, the protrusion resides in the window. In some embodiments, the window of the remote release tab is resiliently deformable and collapses or folds under a rearward pull force applied at the opposite end of the window. The latch arm engages and depresses the latch protrusion, as the window deforms, when the remote release tab is pulled rearward relative to the adapter port. The window and protrusion contained therein exert a downward force on the latch to release the connector from the adapter port.

In some embodiments, the tip of the remote release tab is a latch. The connector may have a latch arm connected to the latch, the remote release arm may further comprise a window or guide further configured to receive the latch arm and the latch arm is slidable within the guide. The remote latch arm is secured to the latch at one end. In some embodiments, the secured end of the latch arm is deformable. One or more widthwise folds in the latch arm provide flexible joints that deform when the remote release tab is pulled rearward relative to the adapter port. The guide prevents the remote release tab from folding at other positions, and the pull force is exerted onto the latch, the latch moves downward releasing the connector from the adapter port.

Some embodiments, such as embodiments having multiple ferrules and embodiments having multiple fiber ferrule connectors, are further configured to allow reversing the polarity. For example, in some embodiments, a guide of the remote release tab may be configured to rotate about 180 degrees in order to reverse polarity.

FIG. 1 shows one embodiment of an optical fiber connector assembly 100 having a plurality of connectors 102 and a remote release tab 104. In this embodiment, the connector assembly 100 has a plurality of connectors. In other embodiments, the connector assembly may have one or more connectors. Various embodiments may include connectors of different types than shown in FIG. 1. Each connector 102 has a respective connector housing 108 and a respective ferrule 108.

The connector assembly 100 further includes at least one flexible latch arm assembly 110. The latch arm assembly 110 includes at least one flexible latch arm 111. The latch arm assembly 110 is configured to couple to the connectors 102. In other embodiments, each of the connectors 102 may include a respective latch arm. In some embodiments, the latch arm may be formed integrally with one or more connectors in the connector assembly.

The connector assembly 100 further includes a housing 112 configured to receive the connectors 102. The latch arm assembly 110 includes a first portion 114 configured to couple with the connectors 102, for example by coupling to the connector housings 106. The latch arm assembly 110 also includes a second portion 116 configured to be received by the housing 112. In other embodiments, the latch arm assembly 110 may be configured differently than shown in FIG. 1 to allow coupling to the connector assembly 100.

The connector assembly 100 further includes a guide 118 configured to retain the remote release tab 104. In other embodiments, the guide may merely be configured to receive the remote release tab. The connector assembly 100 further includes a back post 122 and a boot 124.

The remote release tab 104 has a body 126. The body 126 may extend over the boot 124 to facilitate remotely releasing the connector assembly from an adapter. In various embodiments, the length of the remote release tab 104 may be selected so as to extend beyond the boot 124 of the connector assembly 100. For example, the length may be selected such that the handle of the remote release tab is located beyond the boot of the connector for easy access.

The body 126 includes a coupling portion 128 configured to couple to the connectors 120. For example, as shown in FIG. 1, the coupling portion 128 includes a window 130 configured to receive at least a portion of the latch arm assembly 110 (as shown by the dotted line). For example, the window 130 may be configured to receive the flexible latch arm 111 of the connectors 102.

The remote release tab 104 further includes a protrusion 132 at one end thereof. The protrusion 132 is shaped as a wedge. In other embodiments, the protrusion 132 may have different shapes and configurations. In various embodiments, the protrusion 132 may be configured to slide along the latch arm 111 of the latch arm assembly 110 and further to interact with an adapter coupled to the connector assembly 100, as the remote release tab 104 is pulled rearward, to decouple the connector assembly from the adapter, as described and illustrated further below in relation to FIGS. 5A, 5B and 6A, 6B.

Figure 6A:
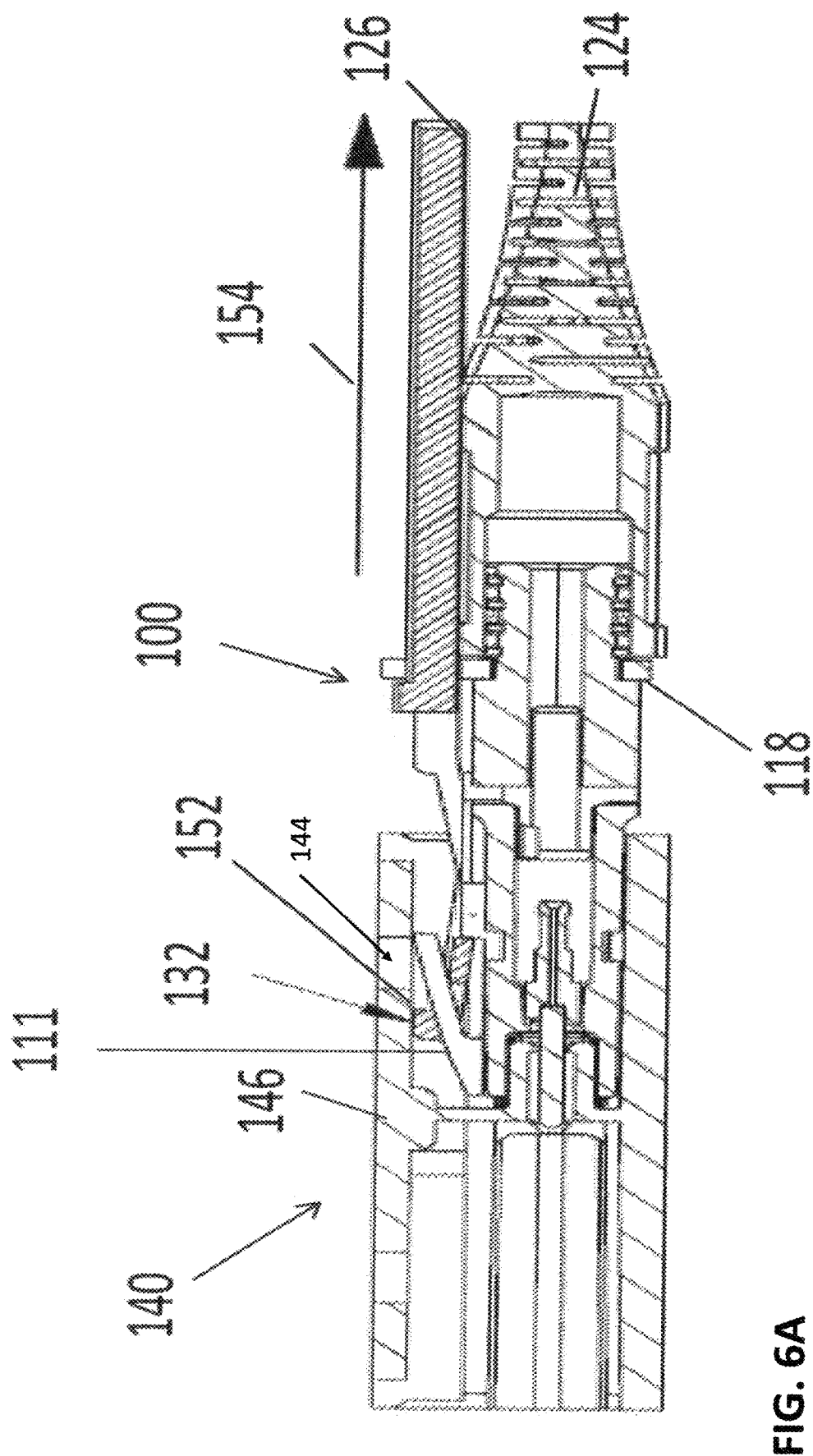
FIG. 6A is a cross-sectional view of the optical fiber connector assembly and adapter of FIG. 4 along section A-A, showing the remote release tab in a rearward position according to aspects of the present disclosure.

In some embodiments, the remote release tab 104 may be removable from the optical connector assembly 100. The remote release tab 104 may also be re-installed by coupling to the connector assembly 100. For example, the guide 118 may be configured to retain the remote release tab 104. The guide 118 may further be configured to allow removing the remote release tab 104 from the connector assembly 100. The guide may further act as a stop, as shown in FIG. 6A, when the remote release tab 104 is pulled rearward 154 to release the latch 111 from the adapter 140. The guide 118 may be configured to retain the remote release pull tab 104 and allow it to slide there through when releasing the connector from the adapter.

In various embodiments, the remote release tab 104 may have a single integral structure. In other embodiments, the remote release tab 104 may comprise a plurality of pieces coupled together to form the remote release tab. For example, in some embodiments, the coupling portion 128 and the protrusion 132 may be formed integrally with the housing 112. In other embodiments, the coupling portion 128 or the protrusion 132 may be separate pieces coupled to each other to form the remote release tab 104.

Figure 2:
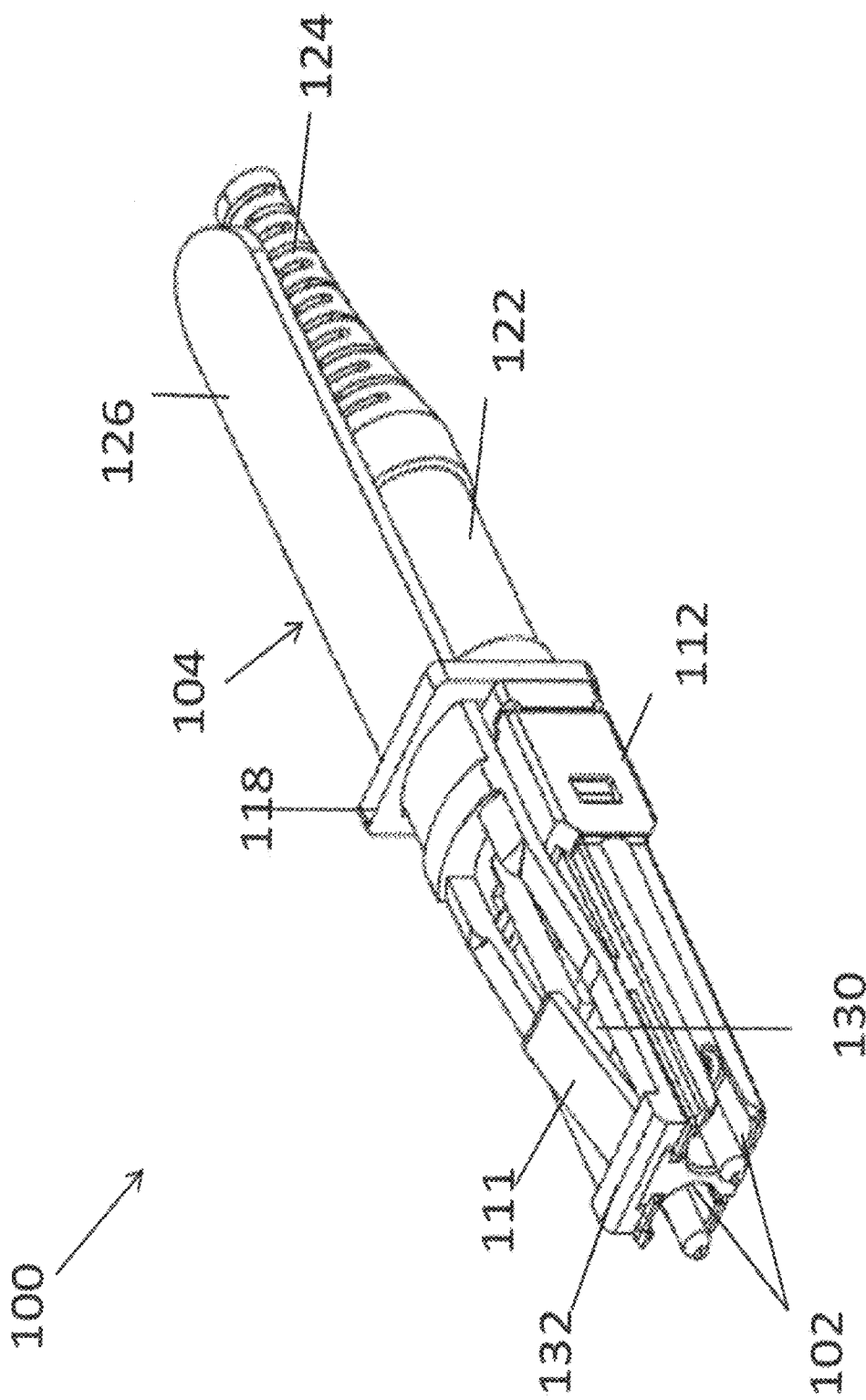
FIG. 2 is a perspective view of the optical fiber connector assembly of FIG. 1 according to aspects of the present disclosure.

FIG. 2 shows a perspective view of the assembled connector assembly 100. As shown in FIG. 2, the latch arm 111 protrudes through the window 130 of the remote release tab 104. The remote release tab 104 is retained by the guide 118 such that the protrusion 132 is disposed at a front end of the connector assembly 100 and may slide along the latch arm 111 as the remote release tab 104 is pulled rearward.

Figure 3:
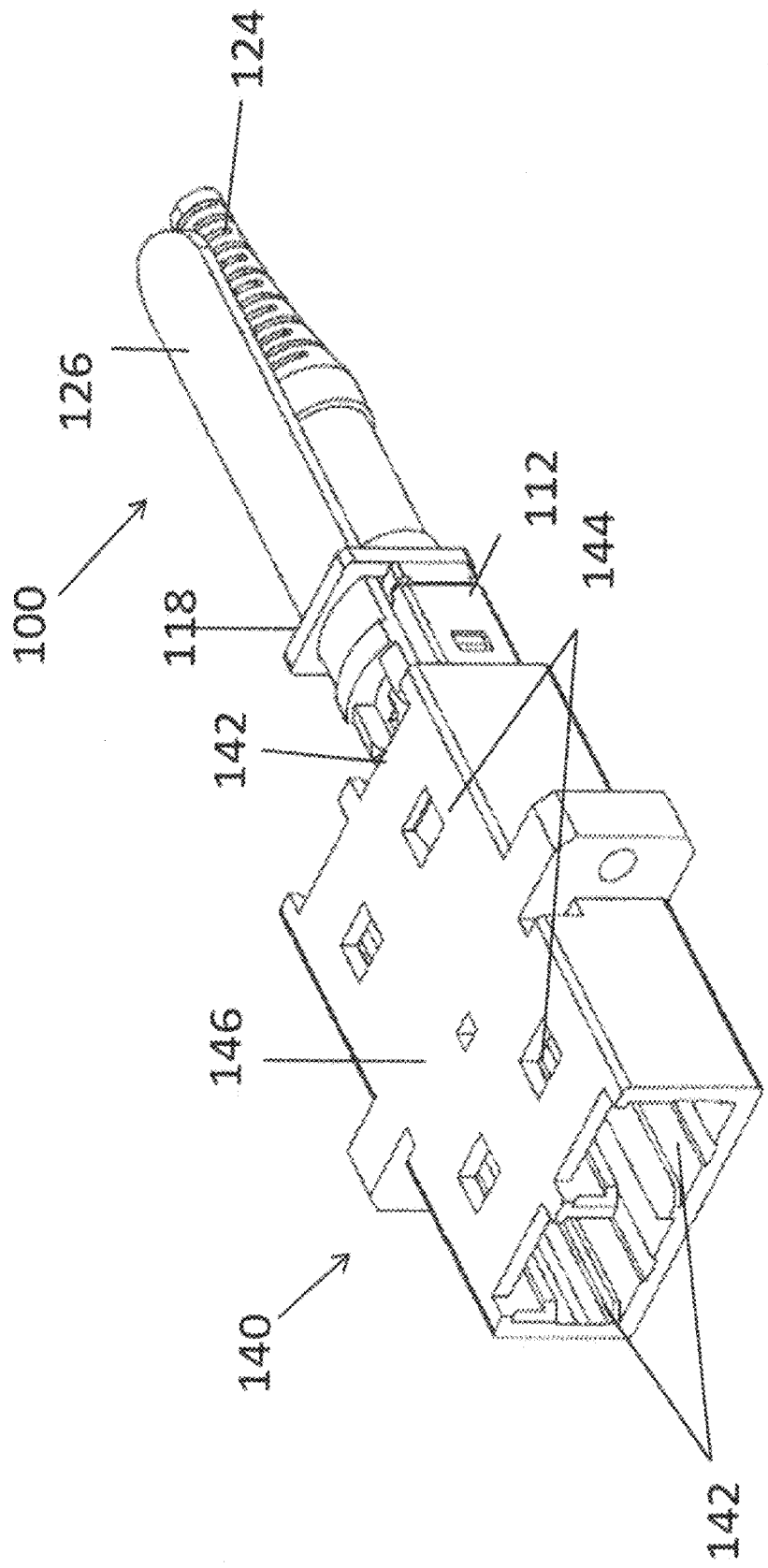
FIG. 3 is a perspective view of the optical fiber connector assembly of FIG. 1 coupled to an adapter according to aspect of the present disclosure.

FIG. 3 shows the connector assembly 100 coupled to an adapter 140. The adapter may have a plurality of channels 142 configured to receive connectors, including for example the connector assembly 100. The adapter 140 further comprises a plurality of openings 144 configured to couple the connector assembly to the adapter. For example, the openings 144 are configured to engage the latch arm 111 of the connector assembly 100 so as to retain the connector assembly 100 within the adapter 140. As the remote release tab 104 is pulled rearward, the protrusion 132 of the remote release tab interacts with both the latch arm 111 and the adapter 143 to release the latch arm from an opening 144, thereby decoupling the connector assembly 100 from the adapter. In one embodiment, the protrusion 132 interacts with an inner portion of a top surface 146 of the adapter 140.

Figure 4:
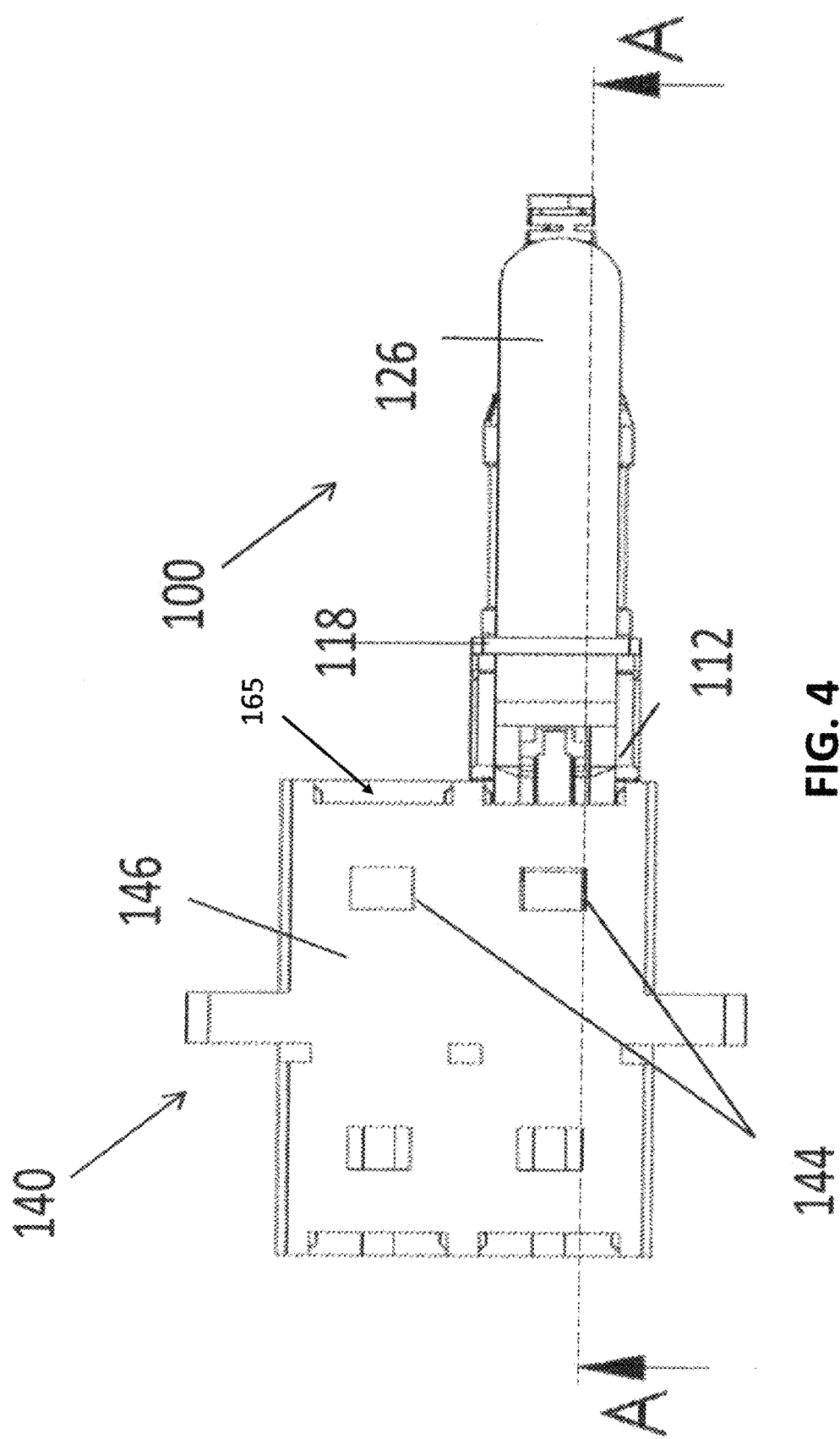
FIG. 4 is a top view of the optical fiber connector assembly and adapter of FIG. 3 according to aspects of the present disclosure.

FIG. 4 shows a top view of the adapter 140 and the connector assembly 100 of FIG. 3. The latch arm assembly 110 and the connectors 102 are received through the channels 142 of the adapter 140 within one or more adapter ports 165. The face of latch arm 138 on the flexible latch arm ill engages a corresponding opening or cutout 144 formed in the adapter 140 housing, as shown in FIG. 4. Unless a user pulls the remote release pull tab rearward, the latch arm remains fixed against the adapter cutout 144 surface, and the connector cannot be removed from the adapter port 165. Upon pulling the remote release tab rearward 154, (FIG. 6A discussed below), the fiber optic connector 102 is released from the adapter 140.

Figure 5A:
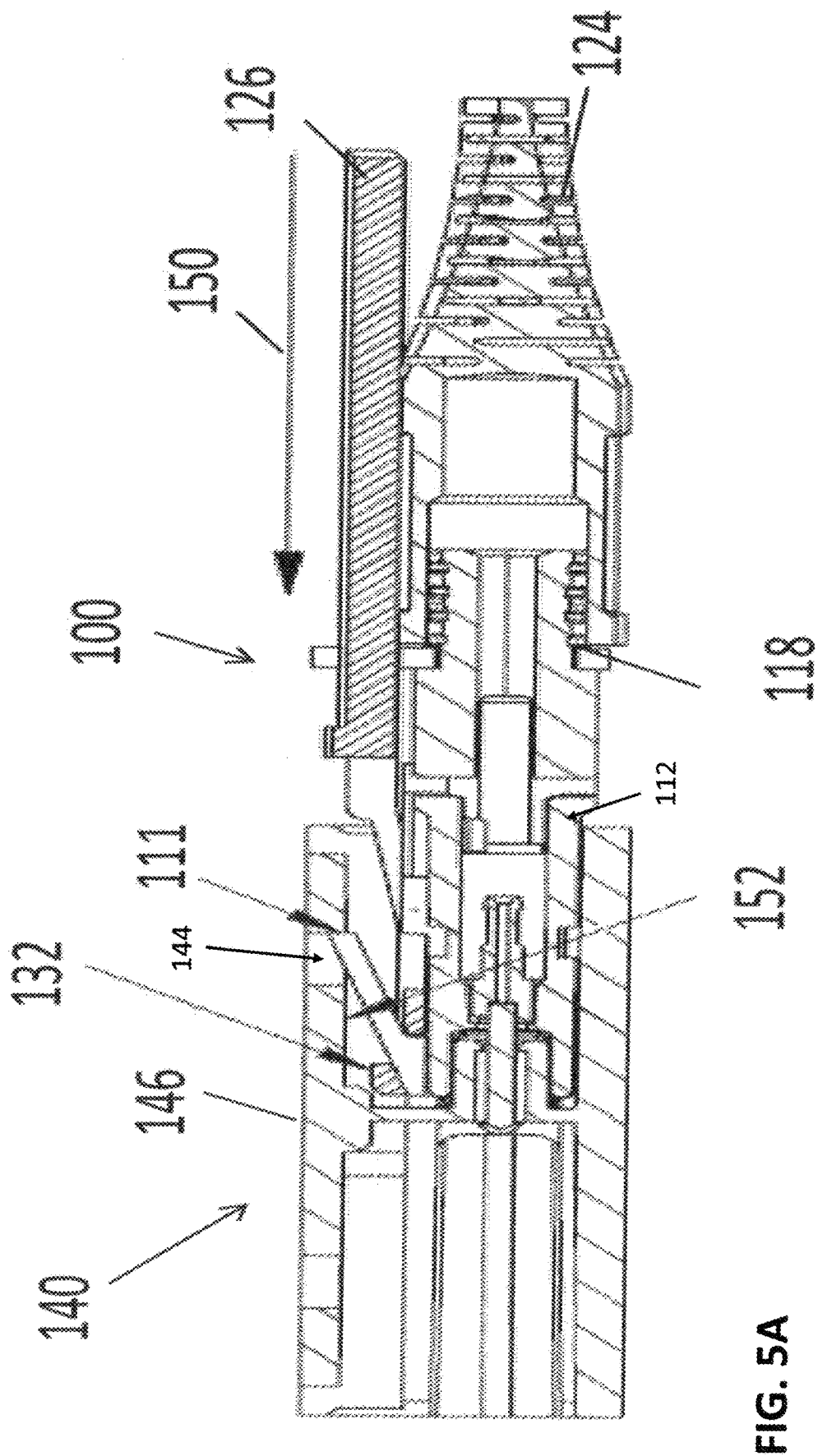
FIG. 5A is a cross-sectional view of the optical fiber connector assembly and adapter of FIG. 4 along section A-A, showing the remote release tab in a forward position according to aspects of the present disclosure.
Figure 5B:
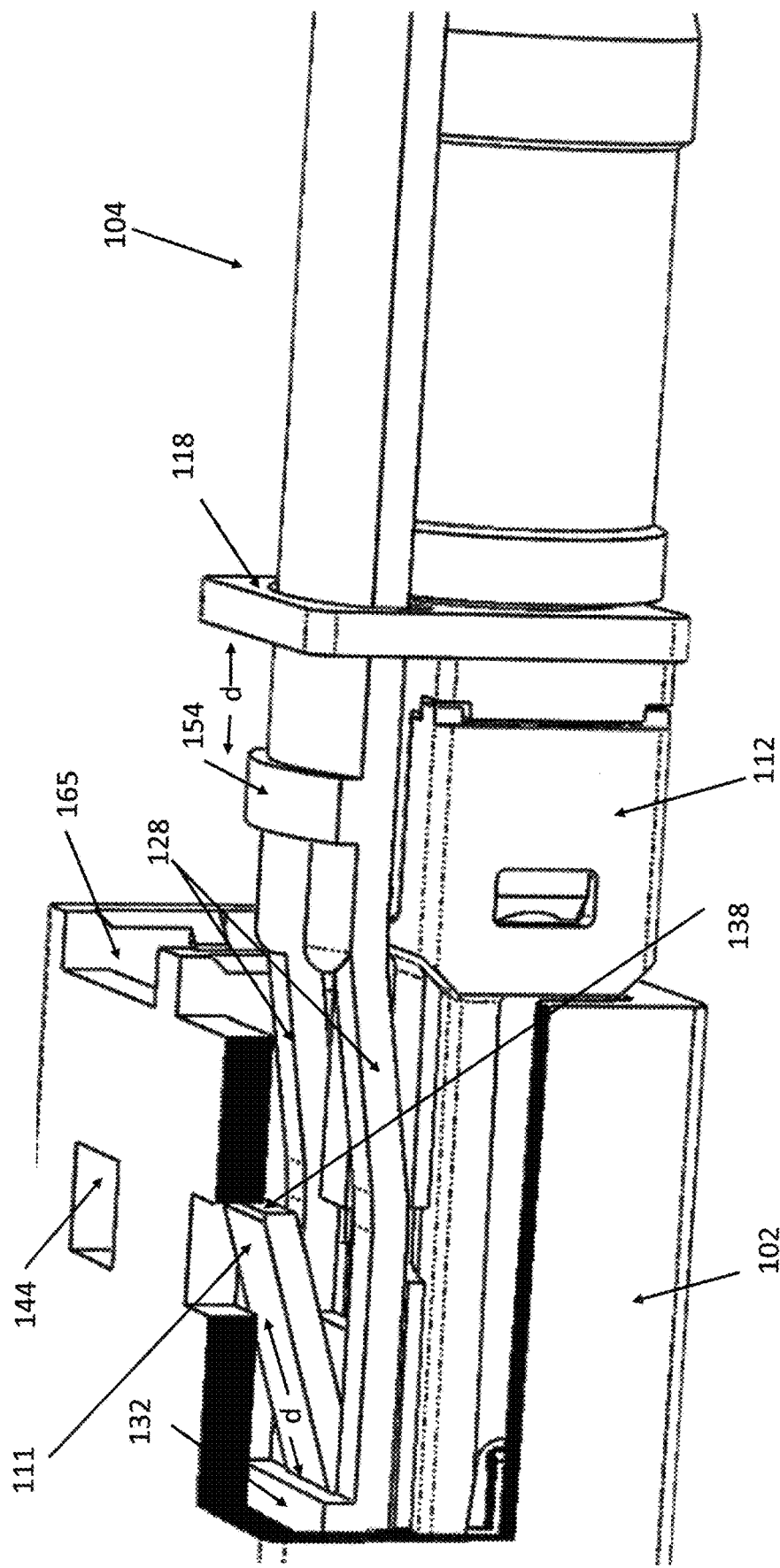
FIG. 5B is cut-out section of the optical fiber connector assembly and adapter of FIG. 4 at a first port, showing the remote release in a forward position or latched position according to aspects of the present disclosure.
Figure 6B:
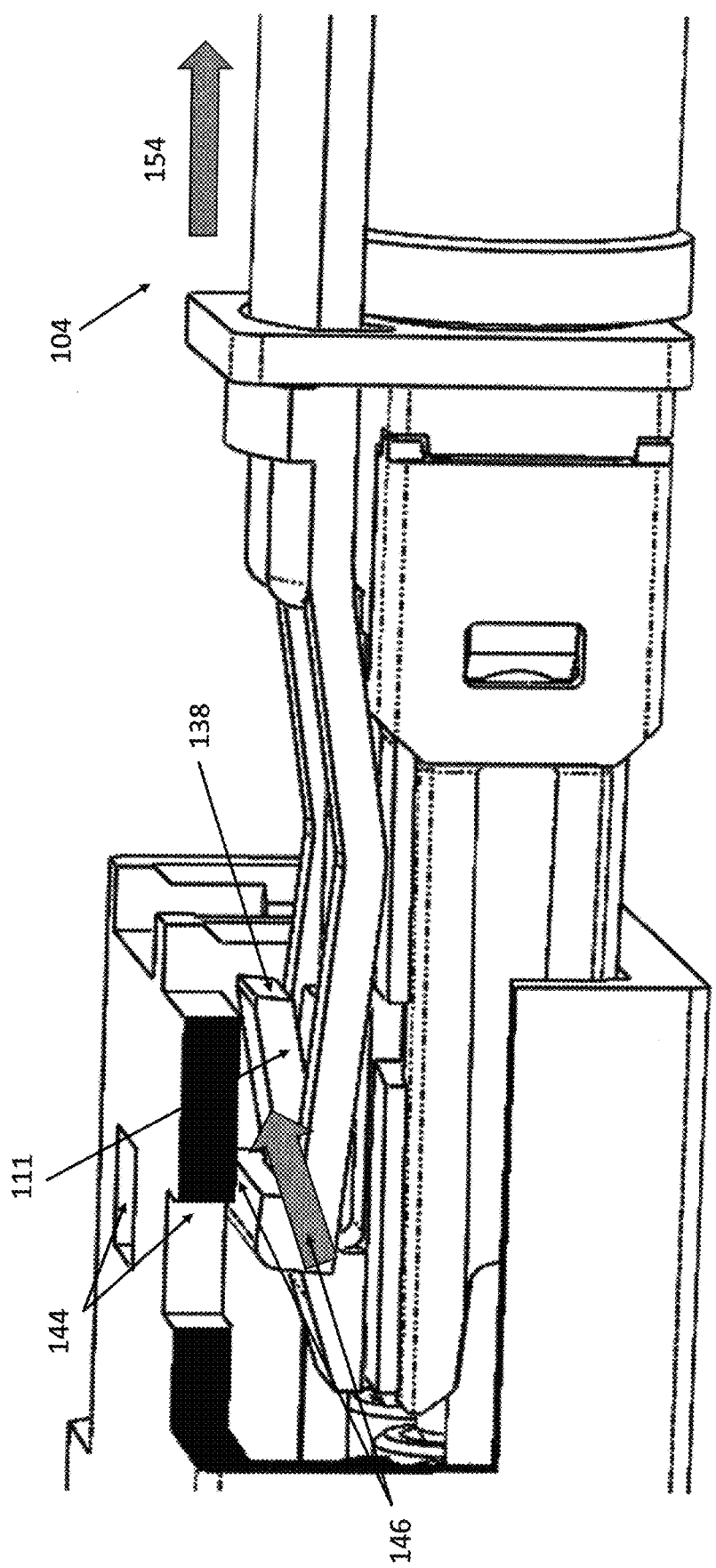
FIG. 6B is a cut-out view of the optical fiber connector assembly and adapter of FIG. 4, showing the remote release tab in a rearward position according to aspects of the present invention.

FIGS. 5A and 6A show a cross-sectional view of the adapter 140 and the connector assembly 100 of FIG. 4 along section A-A. FIGS. 5B and 6B show a cutout view of the connector 102 in the adapter port 165 during various stages of release. FIG. 5A further illustrates the remote release tab 104 in a forward position, as the connector assembly 100 is pushed into the adapter 140 in the direction of the arrow 150. As shown, the connector assembly 100 is coupled to the adapter 140 by the latch arm 111 which engages the opening or cutout 144 of the adapter 140. The opening or cutout 144 is disposed in the top surface 146 of the adapter 140. The protrusion 132 of the remote release tab 104 is disposed at a front end of the latch arm 111. The protrusion 132 does not yet contact an inner portion 152 of the top surface 146.

FIG. 5B further illustrates a cutout view of the connector 102 in the forward position. The stop 154 is forward of the guide 118. The distance between the stop and the guide corresponds to the distance "d" the protrusion 130 must slide along the latch arm 111 to release the latch arm face 138 from within the opening 144. This is further described in FIG. 6B below.

FIG. 6A further illustrates the remote release tab 104 in a rearward position as it is being pulled in the direction of the arrow 154, so as to pull the connector assembly 100 out of the adapter 140. The protrusion 132 of the remote release tab 104 slides along the latch arm 111 and contacts an inner portion 152 of the top surface 146 of the adapter 140. The protrusion 132 continues to slide along the inner portion 152 of the top surface 146 as the remote release tab 104 is pulled further. The protrusion 132 simultaneously begins to push down the connector latch arm 111 while sliding rearward along the inner portion 152 of the top surface 146 of the adapter 140. As the connector latch arm 111 is depressed by the protrusion 132, the connector assembly 100 becomes unlatched from the adapter 140. Referring to FIG. 6B, any additional pulling of the remote release tab 104 results in removing the connectors from the adapter, as the stop 154 engages a face of the guide 118, the latch arm face 138 has cleared the adapter port 165.

Figure 7A:
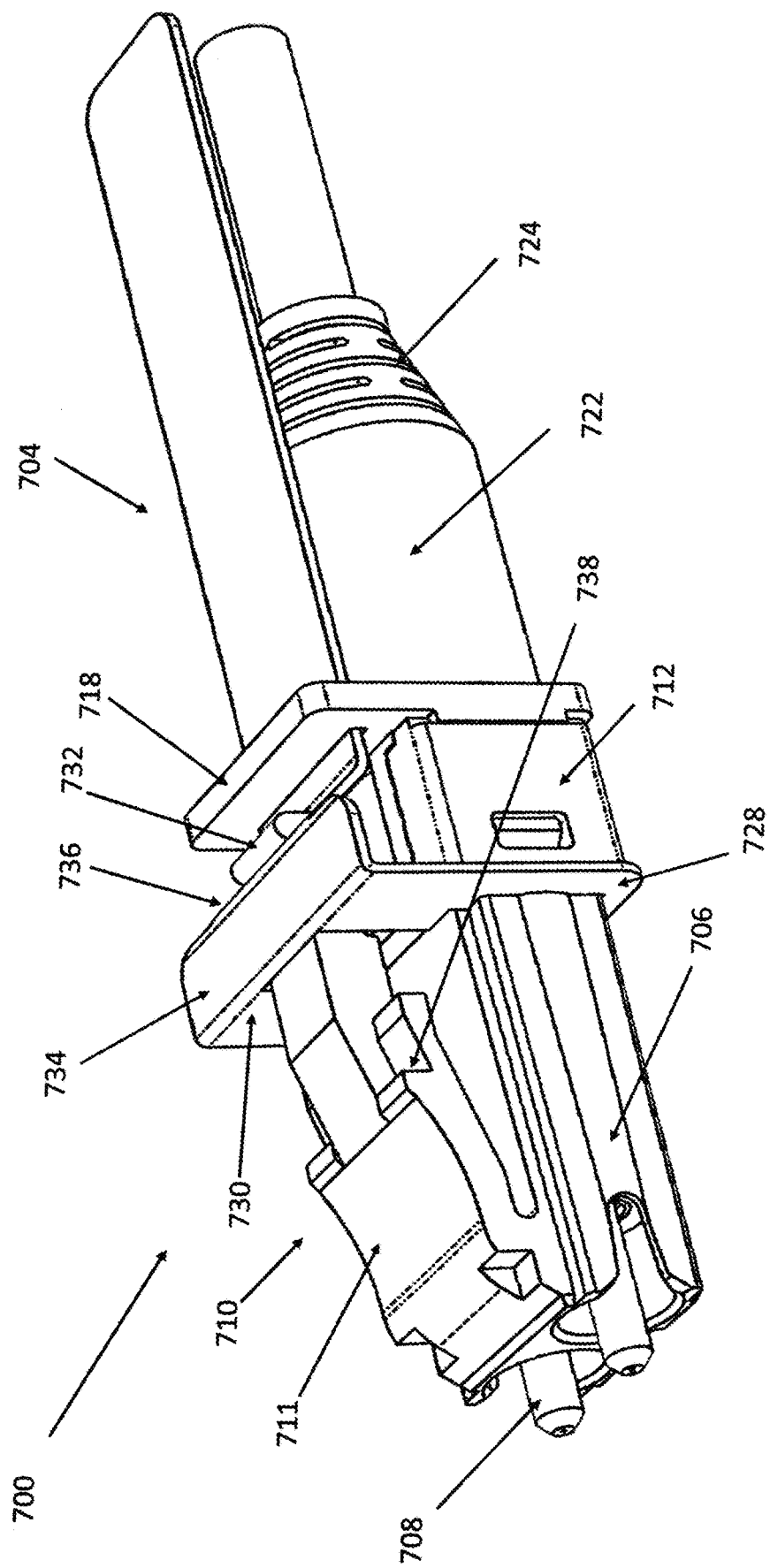
FIG. 7A is a perspective view of an alternative embodiment of the optical fiber connector assembly according to aspects of the present disclosure.

FIGS. 7A-7E illustrate another embodiment of the remoter release tab and its operation with an adapter. FIG. 7A is a perspective view of a fiber optic connector 700 having at least one flexible latch arm assembly 710. The latch arm assembly may be configured differently than shown in FIG. 1 to when coupled to the connector assembly 102. The connector assembly has a guide 718 configured to retain the remote release tab 704, and allow the tab 704 to slide therein as the tab 704 is pulled and pushed to release and secure the connector 102 in a port of the adapter 740.

The remote release tab 704 has a body 726. The body 712 may extend over the boot 724 integrating the back post 722. In various embodiments the length of the pull tab 704 may extend beyond the boot 724. This extended pull tab allows for easier access to release the connector from the adapter. The body 712 may have a coupling portion 728, the coupling portion may have a window 730 and a deformable second end 734, 736. The latch assembly 710 may have a protrusion 732 located at a second end and configured to the retained within the window 730. Unlike FIG. 2, the protrusion 732 is at an opposite end of the latch arm assembly and is outside the adapter port.

The latch arm assembly 110 may contain a latch 711 at one end, the latch 711 has at least one latch cutout 738 along one side of the latch. The latch cutout 738 is configured to engage and lock to a corresponding adapter housing opening 744, upon full insertion of the connector 700 into the adapter 740, as described in FIG. 7C.

FIG. 7B illustrates the connector 700 latch arm assembly in a first position when the remote release tab 704 is in its most forward position. The bottom illustration is the connector 700 latch arm assembly in a second position when the remote release tab is pulled fully rearward 754 to allow the connector to be released from the adapter (not shown). The deformable regions (734, 736) flex and pull the protrusion downward, which in turn pulls the latch cutout 738 downward thereby releasing the connector from the adapter.

Figure 7C:
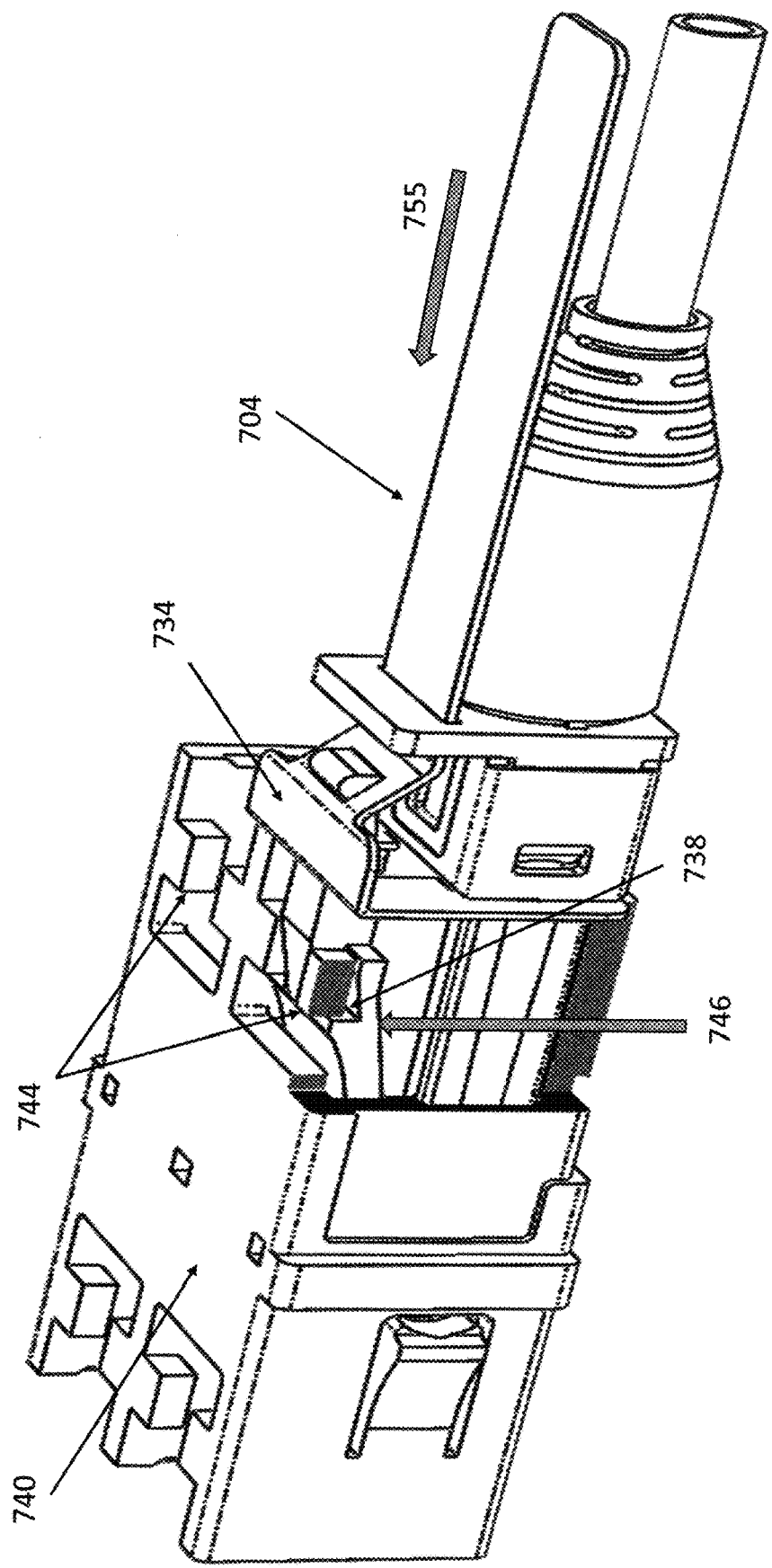
FIG. 7C is a cut-out view of the fiber optic connector of FIG. 7A in the first position in a first port of an adapter according to aspects of the present disclosure.

FIG. 7C illustrates the connection 700 inserted into the adapter 740. The latch assembly deformable region 734 is substantially not deformed. The protrusion 732 is in fully upright position holding the deformable region in is not deformed position. The latch 711 is exerting an upward force 746 when secured in the adapter. This ensures the protrusion is fully upright. The at least one latch cutout 738 is secured in the adapter housing opening 744. Any attempt to pull on the connector, other than the remote release tab 704, the latch cutout 738 will stay engaged in the adapter opening 744 thereby preventing inadvertent release of the connector 700 from the adapter 740.

Figure 7D:
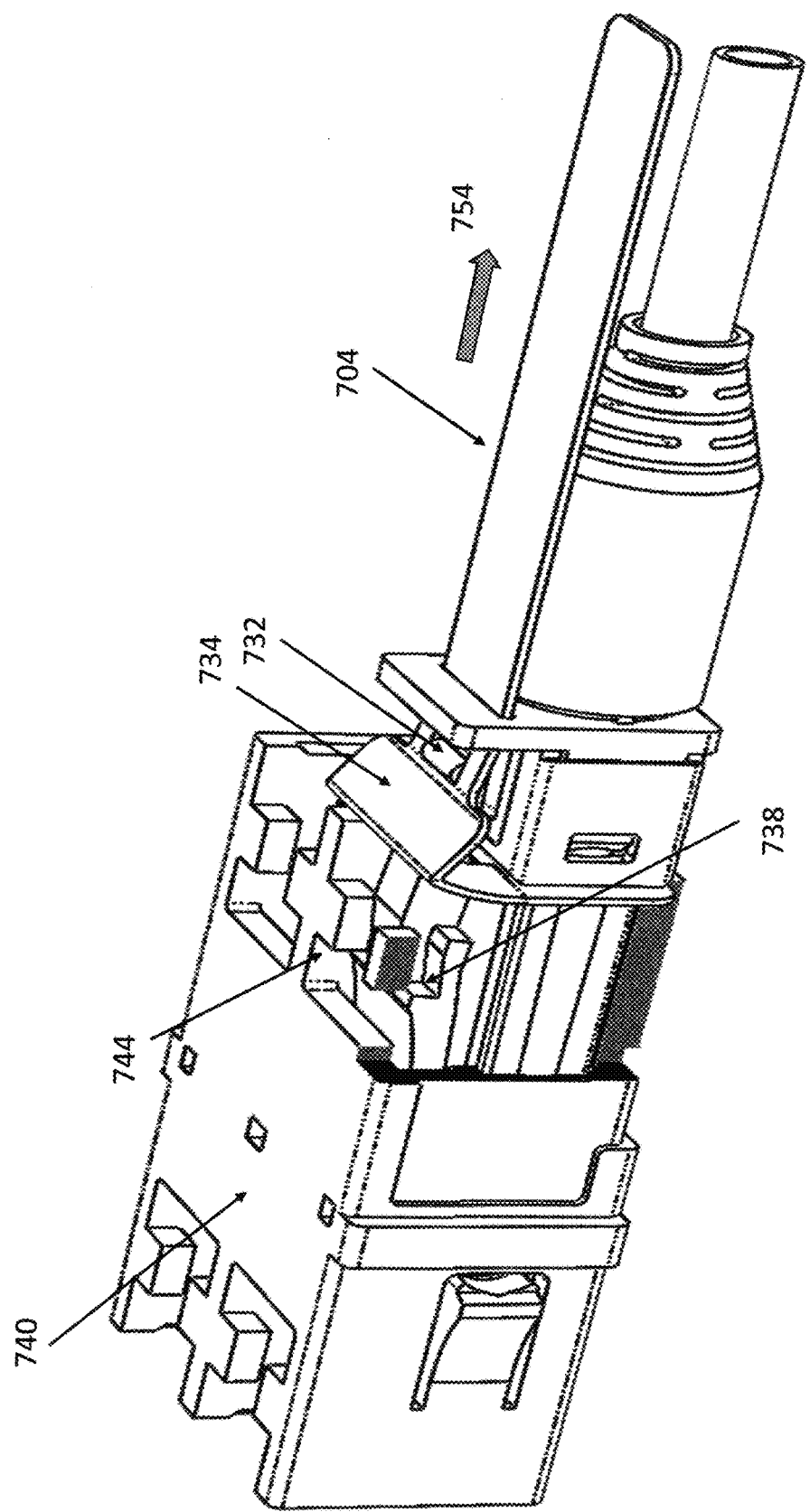
FIG. 7D is a cut-out of the fiber optic connector of FIG. 7A in the second position the first port of an adapter according to aspects of the present disclosure.
Figure 7E:
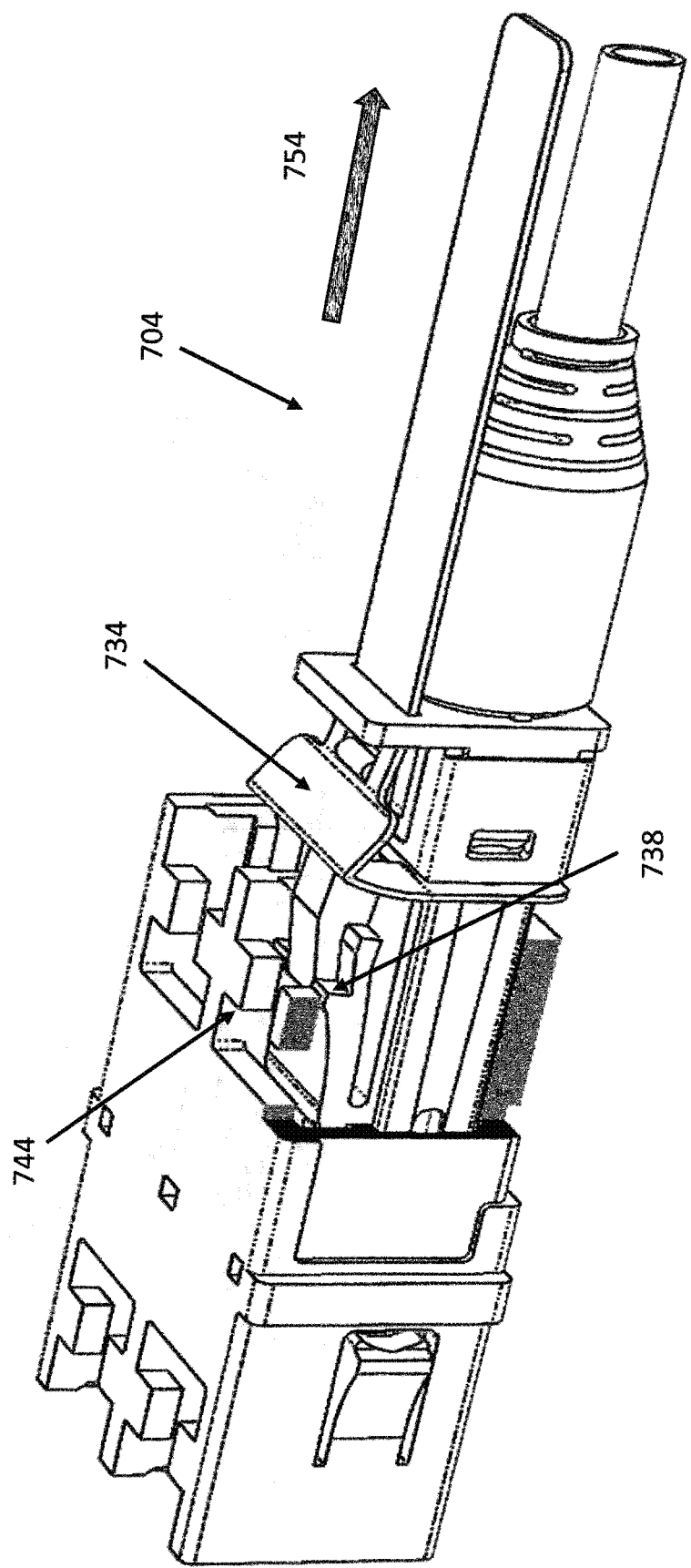
FIG. 7E is the fiber optic connector of FIG. 7D pulled further rearward according to aspects of the present disclosure.

FIGS. 7D and 7E illustrate the release of the connector 700 from the adapter 740. As the remoter release is pulled in the direction of the arrow 754, FIG. 7D, the deformable region 734 folds downward as shown. The protrusion 732 engages a face of the deformable region 734, and the protrusion 732 is pulled downward. This downward movement pulls the latch cutout 738 downward and from within the opening 744. Referring to FIG. 7E, as the pull force is extended (as shown in arrow 754), the deformable region 734 is further deformed until the protrusion 732 reaches the guide 718. At this point, the latch cutout 738 has fully released from within the adapter opening 744 thereby releasing the connector from the adapter.

Figure 8A:
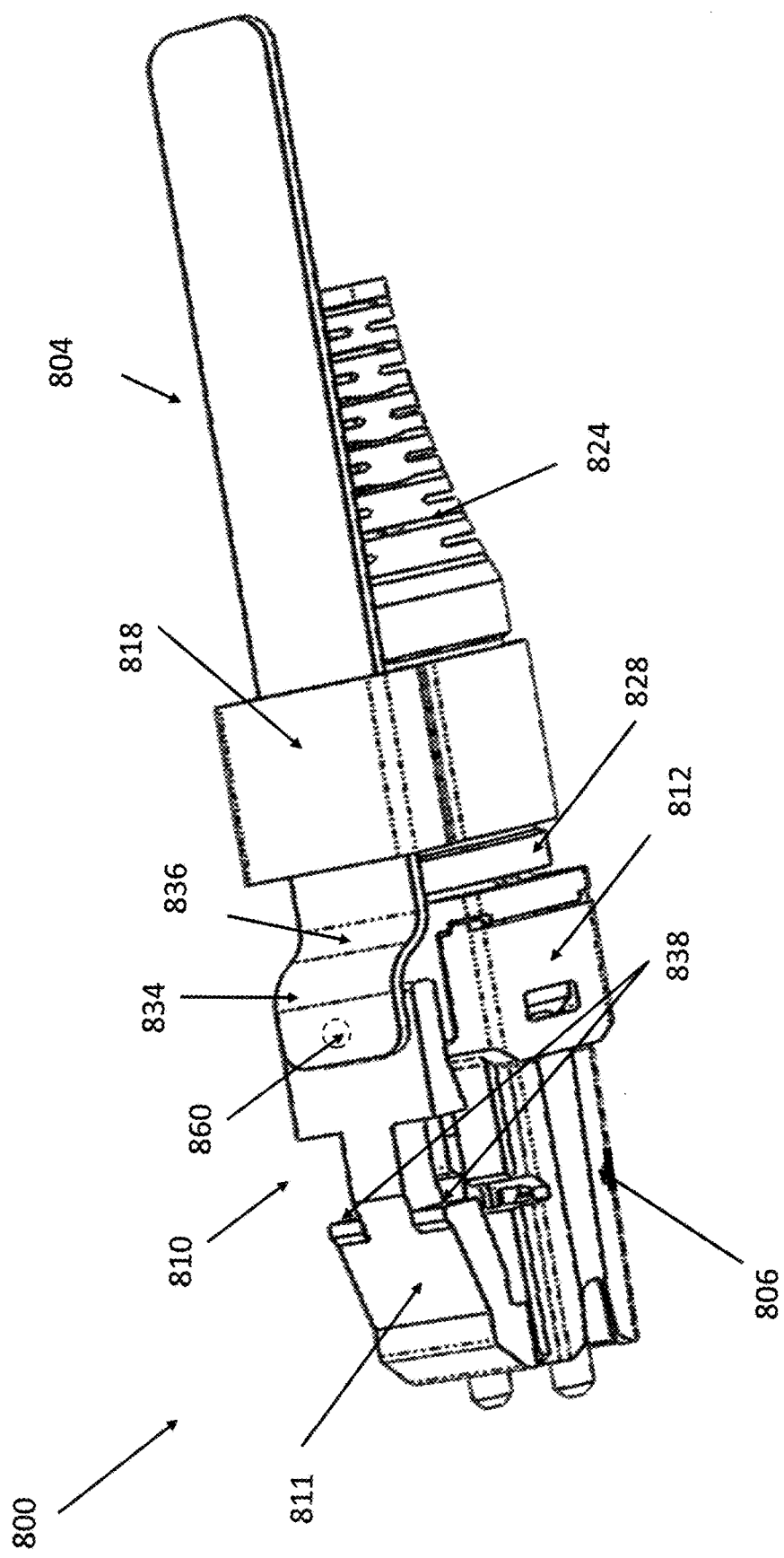
FIG. 8A is a perspective view of another embodiment of a fiber optic connector according to aspects of the present disclosure.
Figure 8B:
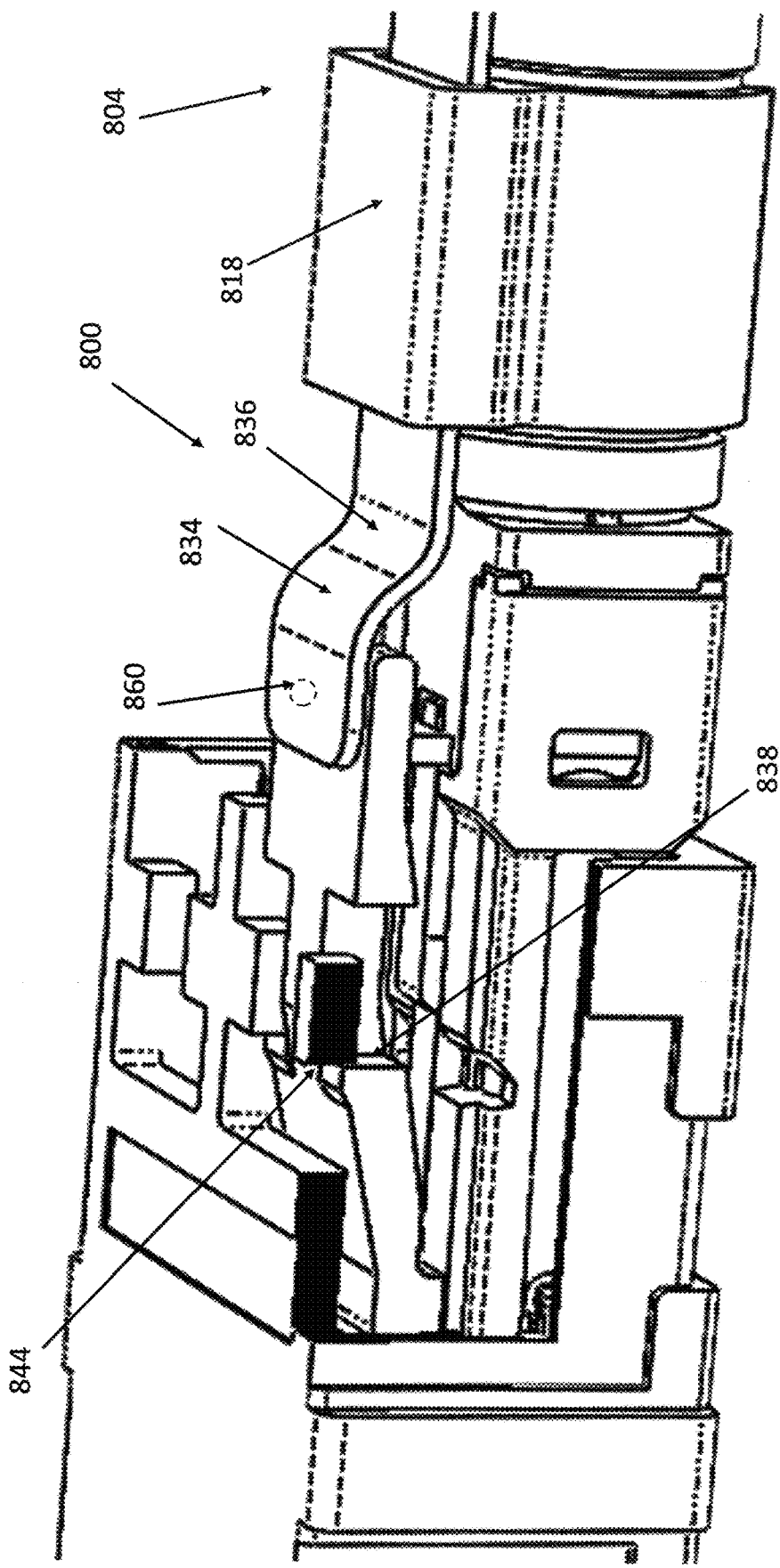
FIG. 8B is a cut-out view of FIG. 8A, in the first position in an adapter according to aspects of the present disclosure.
Figure 8C:
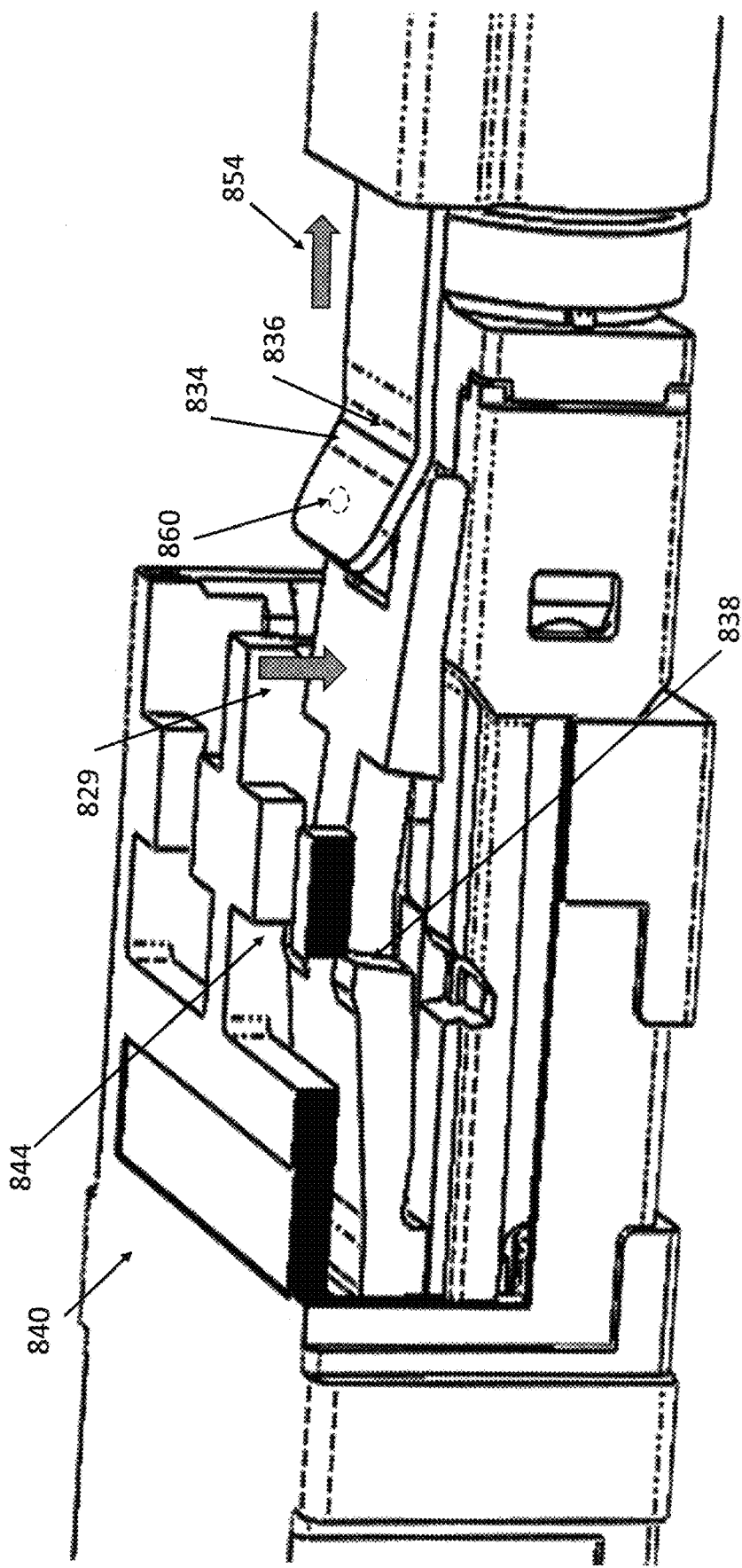
FIG. 8C is a cut-out view of FIG. 8B, pulled further rearward according to aspects of the present disclosure.

FIGS. 8A-8C illustrate another embodiment of the remote release tab 804 and its operation with an adapter. FIG. 8A is a perspective view of a fiber optic connector 800 having at least one flexible latch arm assembly 810. The latch arm assembly may be configured differently when coupled to the connector assembly 102. The connector assembly has a guide 818 configured to retain a remote release tab 804, and allow the tab 804 to slide there through as the tab 804 is pulled and pushed to release and secure the connector to an adapter (not shown).

The remote release tab 804 has a body 812. The body 812 is attached to a connector housing 806. The pull tab 804 may be extended to allow for easy access and removal of the connector from the adapter. The body 812 may have a coupling portion 828 configured to attached a guide 818 to the connector 800. The latch assembly 810 at a first end has a latch 811 and at the second end is the pull tab 826. The latch 811 at a first end has at least one latch cutout 838 and at a second end an anchor point 860. The anchor point is configured to attach a deformable tab portion 834 to the latch 811. The latch cutout 838 is configured to engage and lock to a corresponding adapter housing opening 844 (FIG. 8B), upon fully insertion of the connector 800 into the adapter (not shown).

FIG. 8B illustrates the connector 800 latch arm assembly 810 in a first position when the remote release tab 804 is in its most forward position. The latch assembly deformable region 834, 836 is in a first folded position when the latch cutout 838 is within the adapter opening 844 as shown. In this first position, the connector is secure in the adapter, and any attempt to pull on the connector, other than the pull tab 826, the connector will remain in the adapter.

FIG. 8C illustrates the connector 800 being removed from the adapter 840. As a user pulls on the remote release tab 804 in the direction of the arrow 854, the deformable tab bends at a hinge point between the widthwise fold lines (as shown by the dotted lines) in the deformable regions. The anchor point 860 is configured to retain the pull tab on the latch 811, while the pull force 854 deforms tab downward depressing the latch 811 (as shown in arrow 829) to release the latch cutout 838 from the adapter opening 844 to release the connector 800 from the adapter 840.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may foe used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," et cetera). While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or mere"); the same holds true for the use of definite articles used to introduce claim recitations. In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations). Furthermore, in those instances where a convention analogous to "at least one of A, B, and C, et cetera" is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, et cetera). In those instances where a convention analogous to "at least one of A, B, or C, et cetera" is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, et cetera). It will be further understood by those within the art that that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, et cetera As a non-limiting example, each range discussed herein can be readily broken down into a lower third, middle third and upper third, et cetera As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

The invention claimed is:

1. An optical fiber connector assembly comprising:
   at least one connector having a longitudinal axis;
   a latch arm for coupling to an adapter, the latch arm extending along the longitudinal axis from a front end portion to a rear end portion and having an outboard surface having a length extending longitudinally from the front end portion to the rear end portion; and
   a remote release tab having a front end portion defining a protrusion and a rear end portion defining a gripping tab,
   wherein the gripping tab is configured to be pulled in a rearward longitudinal direction,
   wherein the remote release tab is configured to be displaced in the rearward longitudinal direction as a unit when the gripping tab is pulled in the rearward longitudinal direction, and
   wherein the protrusion is configured to slide longitudinally along the outboard surface of the latch arm such that the protrusion moves from a first point of contact with the outboard surface to a second point of contact with the outboard surface as the remote release tab is displaced in the rearward longitudinal direction and thereby depress the latch arm by camming action,
   wherein the second point of contact is spaced apart from the first point of contact along the length of the outboard surface.

2. The optical fiber connector assembly of claim 1, wherein the remote release tab is coupled to the latch arm.

3. The optical fiber connector assembly of claim 2, wherein the remote release tab further comprises a window configured to receive the latch arm.

4. The optical fiber connector assembly of claim 1, wherein the protrusion is wedge shaped.

5. The optical fiber connector assembly of claim 1, wherein the remote release tab is configured such that the protrusion depresses the latch arm as the protrusion slidably engages an inner portion of the adapter.

6. The optical fiber connector assembly of claim 1, further comprising a boot, wherein the remote release tab is configured to extend over the boot.

7. The optical fiber connector assembly of claim 1, further comprising a guide configured to receive the remote release tab.

8. The optical fiber connector assembly of claim 1, further comprising a housing configured to receive the at least one connector.

9. The optical fiber connector assembly of claim 8, further comprising a latch arm assembly including the latch arm, the latch arm assembly having a first portion configured to couple to the at least one connector and a second portion configured to engage the housing.

10. The optical fiber connector assembly of claim 1, wherein the latch arm is coupled to the at least one connector.

11. The optical fiber connector assembly of claim 1, wherein the at least one connector includes the latch arm as an integral structure.

12. The optical fiber connector assembly of claim 1, wherein the remote release tab is further configured such that the protrusion interacts with an inner portion of the adapter to receive a downward force needed to depress said latch arm.

13. The optical fiber connector assembly of claim 12, wherein the inner portion of the adapter is a fixed portion.

14. An optical fiber connector assembly comprising:
   at least one connector having a longitudinal axis;
   a latch arm for coupling to an adapter, the latch arm extending along the longitudinal axis from a front end portion to a rear end portion and having an outboard surface having a length extending longitudinally from the front end portion to the rear end portion; and
   a release element having a front end portion and a rear end portion,
   wherein the release element is configured to be displaced in a rearward longitudinal direction relative to the latch arm, and
   wherein the front end portion of the release element is configured to slide longitudinally along the outboard surface of the latch arm such that the front end portion of the release element moves from a first point of contact with the outboard surface to a second point of contact with the outboard surface as the release element is displaced in the rearward longitudinal direction and thereby depresses the latch arm by camming action,
   wherein the second point of contact is spaced apart from the first point of contact along the length of the outboard surface.

15. The optical fiber connector assembly as set forth in claim 14, wherein the connector comprises first and second optical ferrules and a single connector housing, the single connector housing comprising a perimeter wall extending 360° circumferentially with respect to the longitudinal axis about a space, each of the first and second optical ferrules being received in the space.

16. The optical fiber connector assembly as set forth in claim 15, wherein the latch arm and the release element are configured to be releasably connected to the connector housing on a first side of the perimeter wall to define a first polarity of the optical fiber connector assembly and wherein the latch arm and the release element are configured to be releasably connected to the connector housing on a second side of the perimeter wall opposite the first side to define a second polarity of the optical fiber connector assembly.

17. The optical fiber connector assembly as set forth in claim 16, wherein the release element comprises an opening configured to receive the latch arm and the front end portion of the release element defines a front end of the opening.

18. The optical fiber connector assembly as set forth in claim 16, wherein each of the first side of the connector housing and the second side of the connector housing includes a groove having an open axial end and the latch arm comprises a portion configured to be inserted into the groove through the open axial end to connect the latch arm to the connector housing.

19. The optical fiber connector assembly as set forth in claim 16, wherein the perimeter wall of the housing radially overlaps a longitudinal segment of each of the first and second optical ferrules with respect to the longitudinal axis.

* * * * *